(12) United States Patent
Volotinen

(10) Patent No.: US 12,430,603 B2
(45) Date of Patent: Sep. 30, 2025

(54) METHOD, APPARATUS, AND SYSTEM FOR MULTIMODAL POSITION SELECTION FOR A TRACKING DEVICE

(71) Applicant: HERE Global B.V., Eindhoven (NL)

(72) Inventor: Minja Volotinen, Tampere (FI)

(73) Assignee: HERE Global B.V., Eindhoven (NL)

( * ) Notice: Subject to any disclaimer, the term of this patent is extended or adjusted under 35 U.S.C. 154(b) by 150 days.

(21) Appl. No.: 17/704,953

(22) Filed: Mar. 25, 2022

(65) Prior Publication Data

US 2023/0306359 A1    Sep. 28, 2023

(51) Int. Cl.
*G06Q 10/0833*    (2023.01)
*G01S 5/02*    (2010.01)
*H04W 4/029*    (2018.01)

(52) U.S. Cl.
CPC ........ *G06Q 10/0833* (2013.01); *G01S 5/0263* (2013.01); *H04W 4/029* (2018.02); *G01S 5/0244* (2020.05)

(58) Field of Classification Search
CPC . G06Q 10/0833; H04W 4/029; G01S 5/0063; G01S 5/0236

(Continued)

(56) References Cited

U.S. PATENT DOCUMENTS 9,823,724 B2    11/2017    Vaccari et al.
2009/0098880 A1    4/2009    Lindquist (Continued)

FOREIGN PATENT DOCUMENTS

EP    2368092 B1 *    12/2014    ............ G01S 19/49
EP    2939482    11/2015

(Continued)

OTHER PUBLICATIONS

N. Deblauwe and G. Treu, "Hybrid GPS and GSM localization—energy-efficient detection of spatial triggers," 2008 5th Workshop on Positioning, Navigation and Communication, Hannover, Germany, 2008, pp. 181-189. (Year: 2008).*

(Continued)

*Primary Examiner* — Jeff Zimmerman
*Assistant Examiner* — Hunter Molnar
(74) *Attorney, Agent, or Firm* — DITTHAVONG, STEINER, & MLOTKOWSKI

(57) ABSTRACT

An approach is provided for multimodal position selection based on an aggregated previous position of a tracking device. The approach, for example, involves receiving a telemetry item from the tracking device. The tracking device is configured with a plurality of positioning technologies to generate position signals respectively. A plurality of positions of the tracking device are respectively determined using the position signals. The approach also involves based on determining that the tracking device is stationary by determining that at least one of the plurality of positions is less than a threshold distance from a previous position or an aggregated previous position of the tracking device, selecting a position from the plurality of positions that is closest to the aggregated previous position of the tracking device. The approach further involves assigning the selected position to the telemetry item. The approach further involves providing the telemetry item with the selected position as an output.

18 Claims, 16 Drawing Sheets

(58) Field of Classification Search
USPC .......................................................... 705/333
See application file for complete search history.

(56) References Cited

U.S. PATENT DOCUMENTS

| | | |
|---|---|---|
| 2012/0172055 A1 | 7/2012 | Edge |
| 2013/0170484 A1* | 7/2013 | Kang .................... H04W 64/00 |
| | | 455/456.1 |
| 2014/0310366 A1 | 10/2014 | Fu et al. |
| 2017/0238136 A1 | 8/2017 | Smith |
| 2017/0265041 A1* | 9/2017 | Mahasenan ........... H04W 64/00 |
| 2019/0373594 A1* | 12/2019 | Sadiq .................... H04W 72/23 |

FOREIGN PATENT DOCUMENTS

| | | | | |
|---|---|---|---|---|
| KR | 20160061050 A | * | 5/2016 | ............... G01S 5/06 |
| WO | WO-2018151676 A1 | * | 8/2018 | ............. G01S 19/01 |
| WO | 2020238652 A1 | | 12/2020 | |

OTHER PUBLICATIONS

Office Action for related European Patent Application No. 23163702.6-1206, dated Aug. 29, 2023, 8 pages.

* cited by examiner

METHOD, APPARATUS, AND SYSTEM FOR MULTIMODAL POSITION SELECTION FOR A TRACKING DEVICE

BACKGROUND

Asset tracking (e.g., delivery of goods to destinations) presents significant technical challenges to service providers, especially delivery and logistics service providers. Physical asset tracking have relied on barcode labels or tracking devices attached to or built in the assets, such as medical supplies, expensive equipment, chips, packages, etc. Such tracking devices can use global navigation satellite system (GNSS), cell-positioning, wireless local area network (WLAN), Bluetooth, etc. to broadcast their locations embedded in telemetry data. However, position data in the telemetry data based on various tracking technologies can fluctuate even when the tracking devices are stationary. This causes unstable position reporting of the tracking devices. Accordingly, service providers face significant technical challenges to find technical solutions that can accurately and dynamical position a tracking device in order to improve the efficiency of asset tracking.

SOME EXAMPLE EMBODIMENTS

Therefore, there is a need for an approach for accurate asset tracking via multimodal position selection, for example, based on an aggregated previous position of a tracking device.

According to example embodiment(s), a method comprises receiving a telemetry item from a tracking device. The tracking device is configured with a plurality of positioning technologies to generate position signals respectively. A plurality of positions of the tracking device are respectively determined using the position signals. The method also comprises, based on determining that the tracking device is stationary by determining that at least one of the plurality of positions is less than a threshold distance from a previous position or an aggregated previous position of the tracking device, selecting a position from the plurality of positions that is closest to the aggregated previous position of the tracking device. The method further comprises assigning the selected position to the telemetry item. The method further comprises providing the telemetry item with the selected position as an output.

According to another embodiment, an apparatus comprises at least one processor, and at least one memory including computer program code for one or more computer programs, the at least one memory and the computer program code configured to, with the at least one processor, cause, at least in part, the apparatus to receive a telemetry item from a tracking device. The tracking device is configured with a plurality of positioning technologies to generate position signals respectively. A plurality of positions of the tracking device are respectively determined using the position signals. The apparatus is also caused to, based on determining that the tracking device is stationary by determining that at least one of the plurality of positions is less than a threshold distance from a previous position or an aggregated previous position of the tracking device, select a position from the plurality of positions that is closest to the aggregated previous position of the tracking device. The apparatus is further caused to assign the selected position to the telemetry item. The apparatus is further caused to provide the telemetry item with the selected position as an output.

According to another embodiment, a computer program product may be provided. For example, a computer program product comprising instructions which, when the program is executed by a computer, cause the computer to receive a telemetry item from a tracking device. The tracking device is configured with a plurality of positioning technologies to generate position signals respectively. A plurality of positions of the tracking device are respectively determined using the position signals. The computer is also caused to, based on determining that the tracking device is stationary by determining that at least one of the plurality of positions is less than a threshold distance from a previous position or an aggregated previous position of the tracking device, select a position from the plurality of positions that is closest to the aggregated previous position of the tracking device. The computer is further caused to assign the selected position to the telemetry item. The computer is further caused to provide the telemetry item with the selected position as an output.

According to another embodiment, a computer-readable storage medium carries one or more sequences of one or more instructions which, when executed by one or more processors, cause, at least in part, an apparatus to receive a telemetry item from a tracking device. The tracking device is configured with a plurality of positioning technologies to generate position signals respectively. A plurality of positions of the tracking device are respectively determined using the position signals. The apparatus is also caused to, based on determining that the tracking device is stationary by determining that at least one of the plurality of positions is less than a threshold distance from a previous position or an aggregated previous position of the tracking device, select a position from the plurality of positions that is closest to the aggregated previous position of the tracking device. The apparatus is further caused to assign the selected position to the telemetry item. The apparatus is further caused to provide the telemetry item with the selected position as an output.

According to another embodiment, an apparatus comprises means for receiving a telemetry item from a tracking device. The tracking device is configured with a plurality of positioning technologies to generate position signals respectively. A plurality of positions of the tracking device are respectively determined using the position signals. The apparatus also comprises means for, based on determining that the tracking device is stationary by determining that at least one of the plurality of positions is less than a threshold distance from a previous position or an aggregated previous position of the tracking device, selecting a position from the plurality of positions that is closest to the aggregated previous position of the tracking device. The apparatus further comprises means for assigning the selected position to the telemetry item. The apparatus further comprises means for providing the telemetry item with the selected position as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for multimodal position selection based on an aggregated previous position of a tracking device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
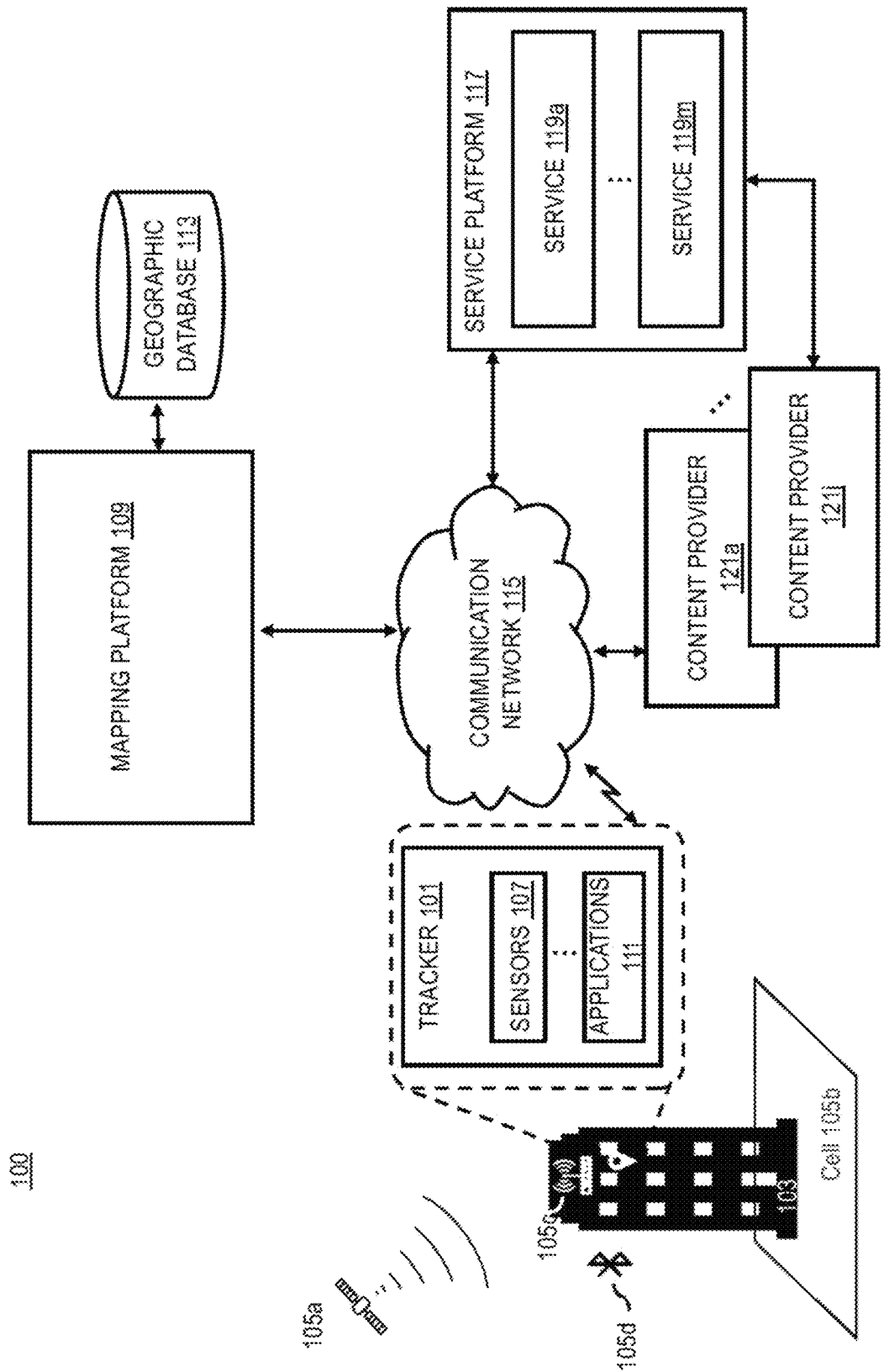
FIG. 1 is a diagram of a system capable of multimodal position selection based on an aggregated previous position of a tracking device, according to example embodiment(s)

FIG. 1 is a diagram of a system 100 capable of multimodal position selection based on an aggregated previous position of a tracking device, according to example embodiment(s). Multimodal tracking introduces several challenges to asset tracking and the efficient usage of tracking devices (also referred to as tracker). The tracker is a device that collects data and sends (ingests) it to a tracking back-end. The data can contain, for example, sensor data, positioning data and measurements of the environment using different position technologies, such as WLAN, Bluetooth, and cell scans, etc. The different position technologies offer different levels of accuracy and availability depending on the tracker's location and surrounding environment. For instance, GPS and WLAN provide accuracy of 5-30 meters, while cell technology provide an accuracy of km. Trackers report the data as telemetry to the tracking back-end, which evaluates the data and provides a derived position for e.g., displaying on a map user interface, for geofence rule evaluation, etc.

Because of the variable and dynamic nature of the environment and position technologies, the signal quality and/or location accuracy of the reported measurements are often unreliable. For instance, when the tracker is stationary, competing positions may be derived from the different positioning technologies. The current approach is to select the position technology data with the best reported accuracy for deriving a position of the tracker, which, however, results in an unstable position report.

Figure 2A:
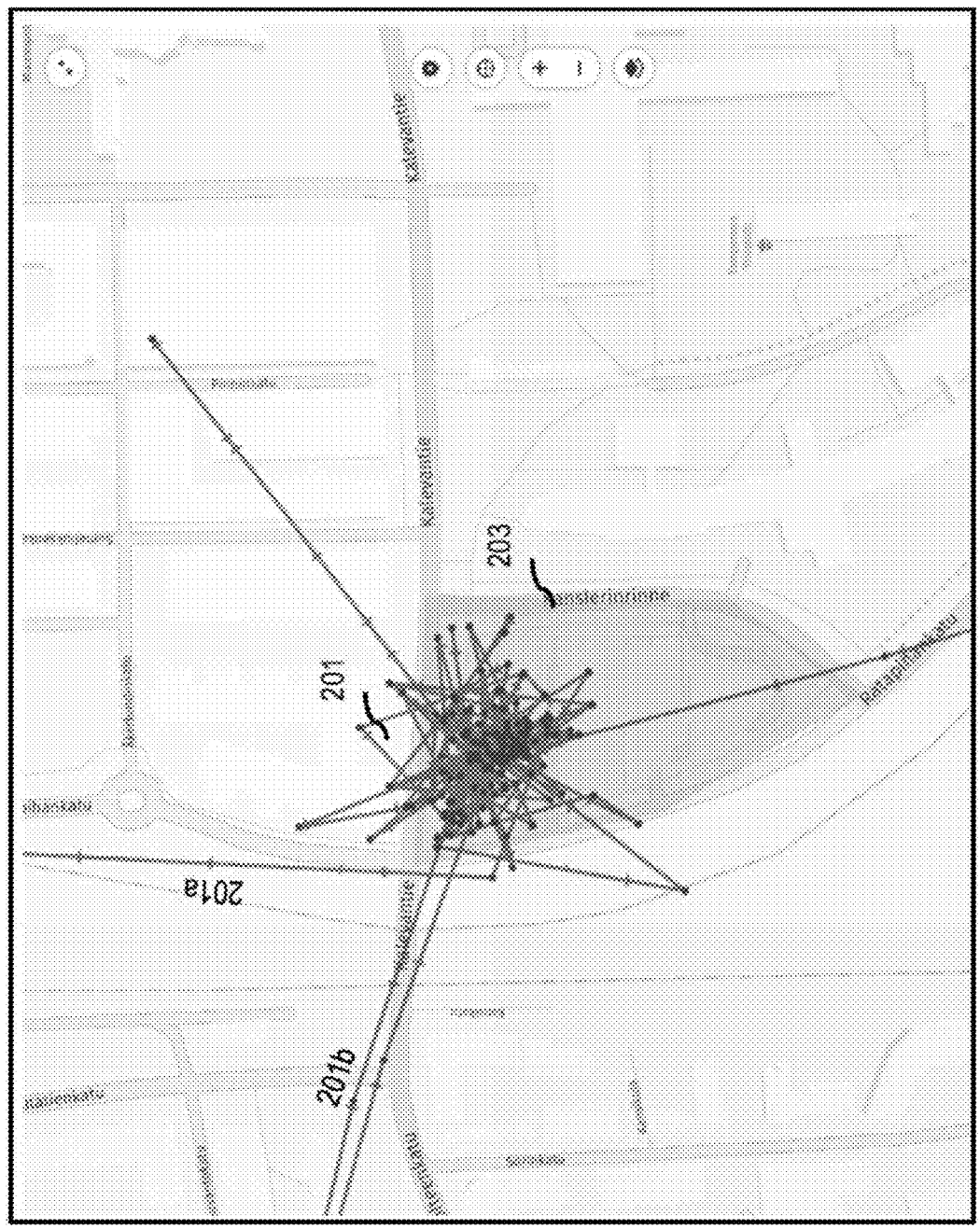
FIG. 2A is a diagram illustrating a user interface showing an example position report resulted from an existing multimodal position selection approach, according to example embodiment(s)

FIG. 2A is a diagram illustrating a user interface (UI) 200 depicting an example position report resulted from an existing multimodal position selection approach, according to example embodiment(s). For instance, although the tracker is stationary in a building, the UI 200 shows the stationary tracker as noticeably moving with trajectories 201 made of trace points, especially with respect to a geofence 203. A geofence is usually defined as a polygon (e.g., artificially drawn) encompassing an area to trigger different actions when devices (e.g., the tracker 101) are located inside/outside the area. For instance, although the tracker 101 only entered and exited the geofence 203 (e.g., set for a building or for a gray area in FIG. 2A) once along the trajectories 201a, 201b, the example position report resulted in confusing trajectories 201 jumping all over the map when the tracker 101 was stationary in the geofence 203. In this case, geofence rules (e.g., associated with the geofence 203) can be triggered many times erroneously, thereby resulting in unwanted automated actions. For instance, the tracker 101 is placed on a piece of jewelry stationary in a department store, yet the wrong position report as outside of the department store thereby necessarily triggering security alarms. As a result, service providers face significant technical challenges to provide reliable asset tracking.

To address this problem, the system 100 of FIG. 1 introduces the capability to provide multimodal position selection based on an aggregated previous position of a tracking device. The multimodal position selection logic solves the problem of simply choosing the most suitable position from position options based on different positioning technologies, when the positioning history of the tracker 101 is known. In one embodiment, the system 100 can get from the tracker 101 (e.g., located in a point of interest 103) telemetry data generated using one or more positioning technologies 105a-105n (also referred to as positioning technologies 105—such as GNSS 105a, Cell 105b, WLAN 105c, Bluetooth 105d, radio-frequency identification (RFID, not shown), etc.).

Since future positions of the tracker 101 are unknown at the time when the system 100 needs to select for the tracker 101 a current position among position options based on different positioning technologies, the system 100 can first determine whether the tracker 101 is stationary. When determined as stationary (i.e., not moving for a time threshold, e.g., a time parameter), the system 100 can select the position which is closest to the previous position or to the previous average position of the tracker 101 as the current location of the tracker 101. For example, the time parameter can be predefined or learned, and/or depend on a position technology type. In one embodiment, the time parameter consists of time and a number of trace points that define "enough data" to be confident to decide whether a tracker is moving or stationary. When the tracker has stayed still for long enough (e.g., 5 or 15 mins), the system 100 may have enough data points to prove the tracker as stationary, then the system 100 can select the closest portion to an aggregated previous position as the position of the tracker. In another embodiment, the mode of transport and the typical behavior of the tracker are known, the system 100 can use such information to learn the time parameter.

For instance, the previous average position of the tracker 101 can be the average position of the positions from the time when the tracker 101 has been stationary long enough. When the tracker 101 is moving, the system 100 can select the position option with the best reported accuracy as the current location of the tracker 101. In other words, the system 100 handle differently when the tracker 101 is detected to be moving vs. when it is detected to be stationary.

The moving vs. stationary detection can be based only on the reported position information in the telemetry data without data of, for example, accelerometer, magnetometer, gyroscope, or other sensors. In this method, the tracker 101 is detected as moving if its distance compared to the previous position or the previous average position is greater than a threshold (e.g., 100 meters) plus the combined accuracies of the positions. In other words, the system 100 can compare (1) a distance between a position option and a previous (average) position to (2) 100 meters+accuracies of the previous (average) position+the accuracy of the position option.

In another embodiment, there is some extra logic to handle special cases related to peculiarities of different positioning technologies, such as WLAN and cell-positioning. For instance, due to the general inaccuracy of cell positions, the system 100 can select cell-position only when it is absolutely necessary, such as when there has not been any other position information for long enough time, or if it is likely that the tracker 101 has moved. WLAN-positions are unreliable when the number of WLAN-access points for position resolving is low. In this case, another reference position (e.g., a GNSS or cell position) can be used to validate the unreliable WLAN-position. If the WLAN-position does not pass the validation or if no reference position is available, the system 100 will not select the WLAN-position.

In another embodiment, when detecting positions with an impossible speed, the system 100 can select other available position options with possible speed(s).

In another embodiment, instead of selecting a potentially bad position (e.g., a cell position), the system 100 may sometimes not choose a position at all.

Figure 2B:
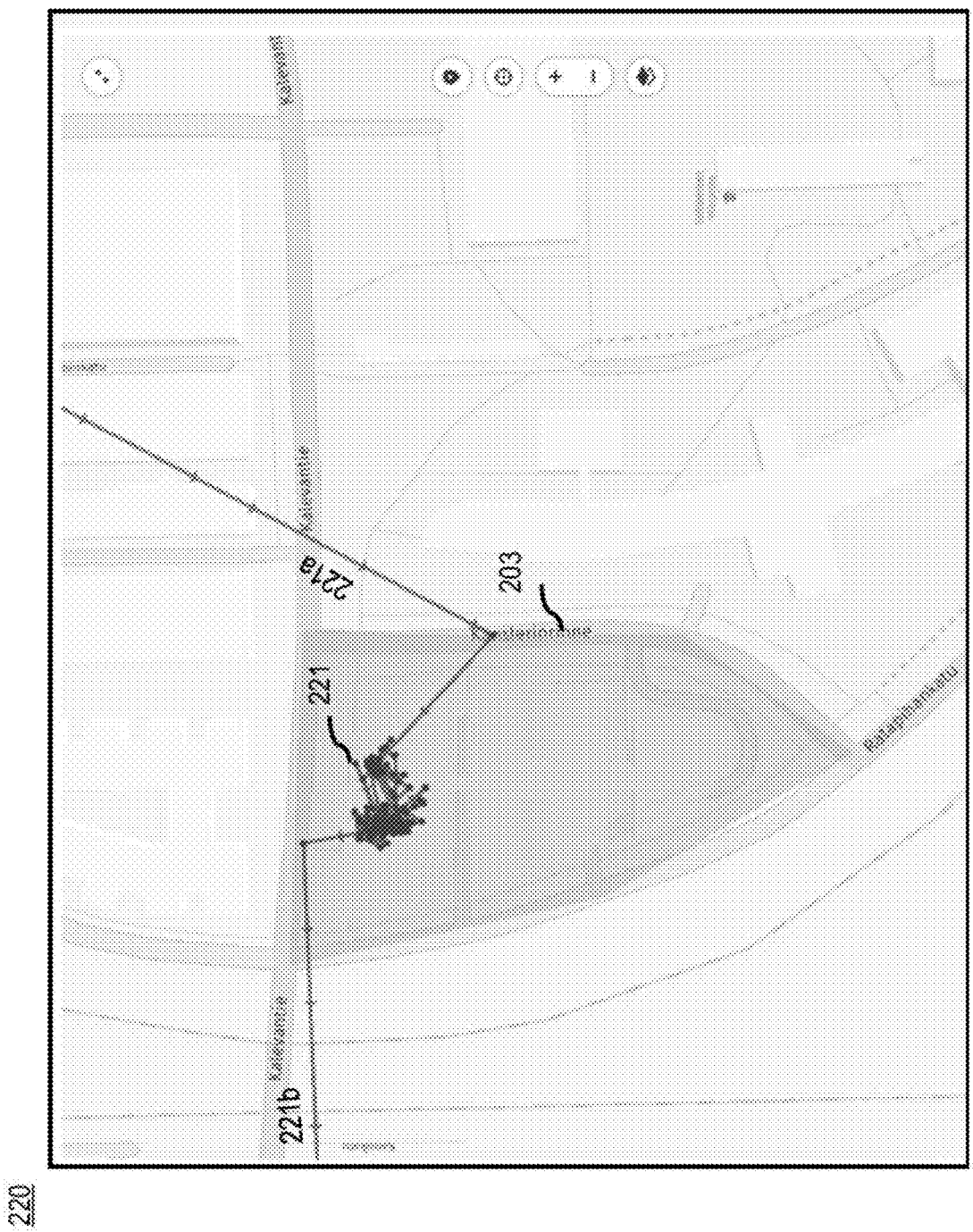
FIGS. 2B-2C are diagrams illustrating user interfaces showing example position report resulted from multimodal position selection based on an aggregated previous position of a tracking device, according to example embodiment(s)
Figure 2C:
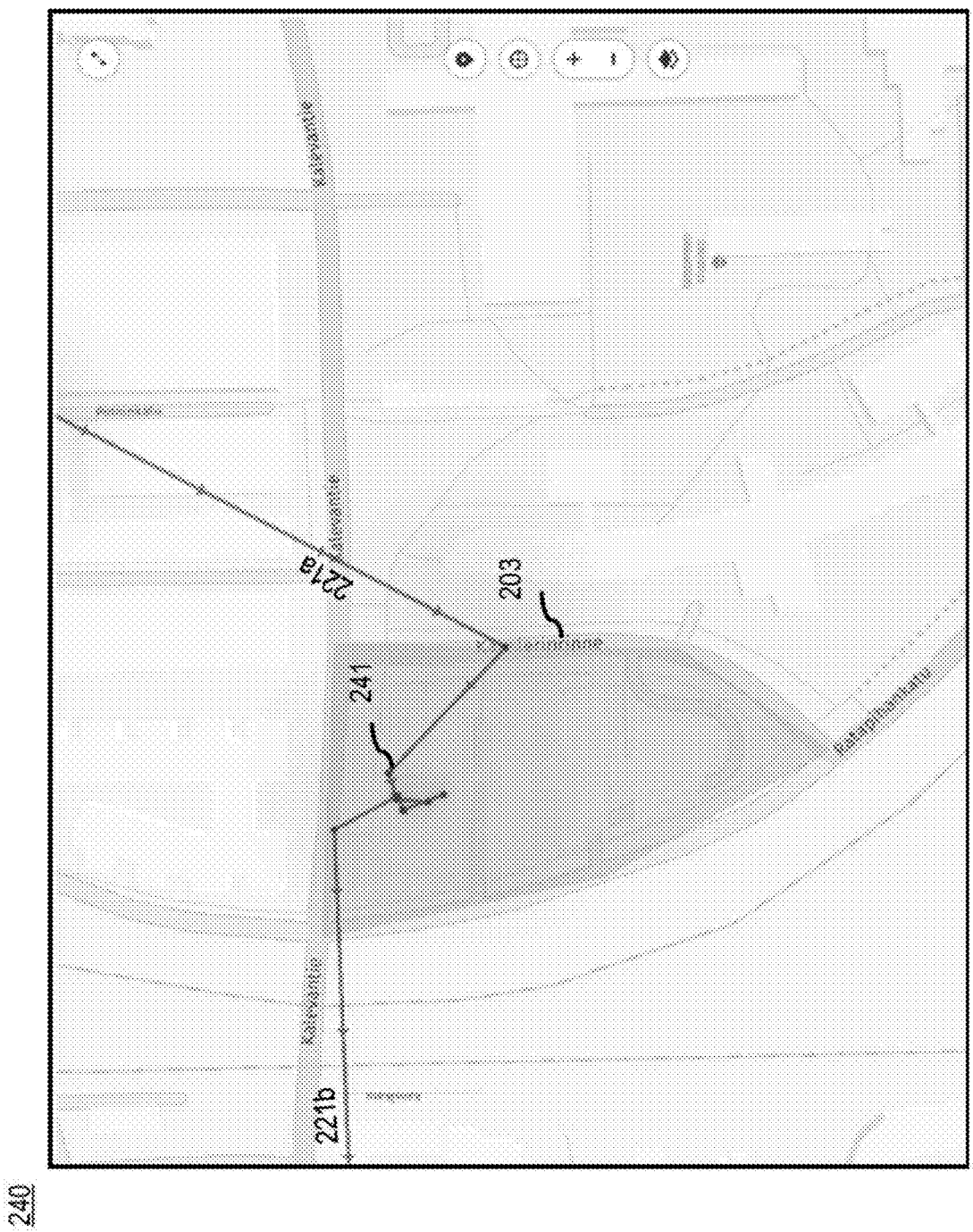

The resulting output position provides for a stable location when the tracker 101 has remained stationary, thereby leading to a stable and more user-friendly UI representation, without ambiguity or confusion (e.g., FIG. 2A). The resulting output position of the tracker 101 also improves geofence oscillation control, i.e., reducing false positive in-out of geofence events. FIGS. 2B-2C are diagrams illustrating user interfaces showing example position report resulted from multimodal position selection based on an aggregated previous position of a tracking device, according to example embodiment(s). In FIG. 2B, based on the above-discussed position selection logic, a UI 220 shows the stationary tracker 101 as moving with trajectories 221 made of trace points mostly within the geofence 203, except entering the geofence 203 along a trajectory 221a and exiting the geofence 203 along a trajectory 221b, the processed position report data is much less confusing than what in FIG. 2A. In this case, geofence rules (e.g., associated with the geofence 203) can be triggered only twice. For instance, the geofence 203 can be defined with respect to any point of interest (POI), such as check points, delivery milestones (e.g., FedEx facilities), changes of transport mode, etc. associated with the POI.

By way of example, the tracker 101 can be carried by a user, a mode of transport (e.g., car, delivery truck, train, boat, airplane, etc.), etc. In one embodiment, the tracker 101 can be built in a user equipment (UE), an internet of things (IOT) object (e.g., a smart factory equipment, robot, patient monitoring device, etc.), a mode of transport, etc. The UE can be a phone, tablet, personal digital assistant (PDA), smart watch, navigation device, drone, smart glass, vehicle-mounted camera, smart clothing with camera, body-worn camera, hands-free camera, as well as another network-connected probe device that are mobile. For instance, the tracker 101 is built in an employee badge for a research facility, thereby correctly logging into the employee's presence data.

In another embodiment, the system 100 can map the selected stationary positions of the same time point into a single average position, thereby smoothing the trajectories 221 in FIG. 2B into trajectories 241 in FIG. 2C with a trace visualization looks even more cleaner when the tracker 101 is stationary.

As shown in FIG. 1, the tracker 101 is connected to a mapping platform 109, and is connected to a geographic database 113), via a communication network 115. The tracker 101 also has connectivity to a service platform 117 that includes one or more services 119a-119m (also collectivity referred to as services 119) for providing mapping and/or location-based services. In one embodiment, the service platform 117 and/or services 119 interact with one or more content providers 121a-121j (also collectively referred to as content providers 121) to provide mapping information or user generated content information to the mapping platform 109.

In one embodiment, the mapping platform 109 can performs the functions of multimodal position selection based on an aggregated previous position of a tracking device as discussed with respect to the various embodiments described herein. By way of example, the mapping platform 109 may exist independently or jointly in a server, the tracker 101, in one or more beacons, in one or more UEs, a cloud computing and/or cloud storage platform, one or more cloud edge computing devices, etc. Further, in one example, a user may use a UE in order to both communicate map-related information within the services 119 (e.g., social network services) as well as receive the telemetry data with the selected position of the tracker 101 generated by the mapping platform 109 and stored in the geographic database 113.

Figure 3:
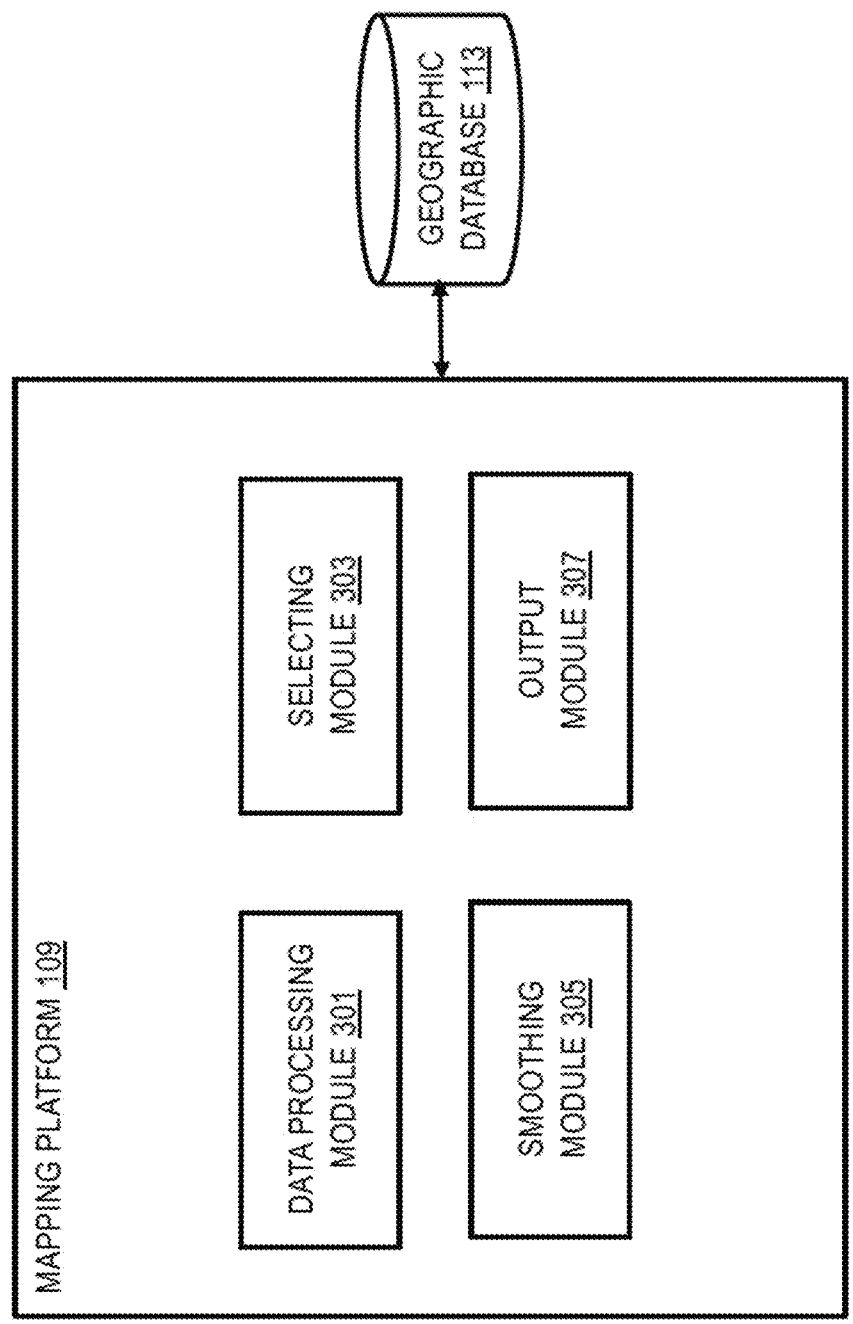
FIG. 3 is a diagram of components of a mapping platform, according to example embodiment(s)

FIG. 3 is a diagram of the components of a mapping platform configured to provide multimodal position selection based on an aggregated previous position of a tracking device, according to example embodiment(s). By way of example, the mapping platform 109 includes one or more components for multimodal position selection based on an aggregated previous position of a tracking device, according to the various embodiments described herein. It is contemplated that the functions of these components may be combined or performed by other components of equivalent functionality. In one embodiment, the mapping platform 109 includes a data processing module 301, a selecting module 303, a smoothing module 305, and an output module 307, and has connectivity to the geographic database 113. The above presented modules and components of the mapping platform 109 can be implemented in hardware, firmware, software, or a combination thereof. Though depicted as a separate entity in FIG. 1, it is contemplated that the mapping platform 109 may be implemented as a module of any other component of the system 100. In another embodiment, the mapping platform 109 and/or the modules 301-307 may be implemented as a cloud-based service, local service, native application, or combination thereof. The functions of the mapping platform 109, and/or the modules 301-307 are discussed with respect to FIGS. 4-6.

Figure 4:
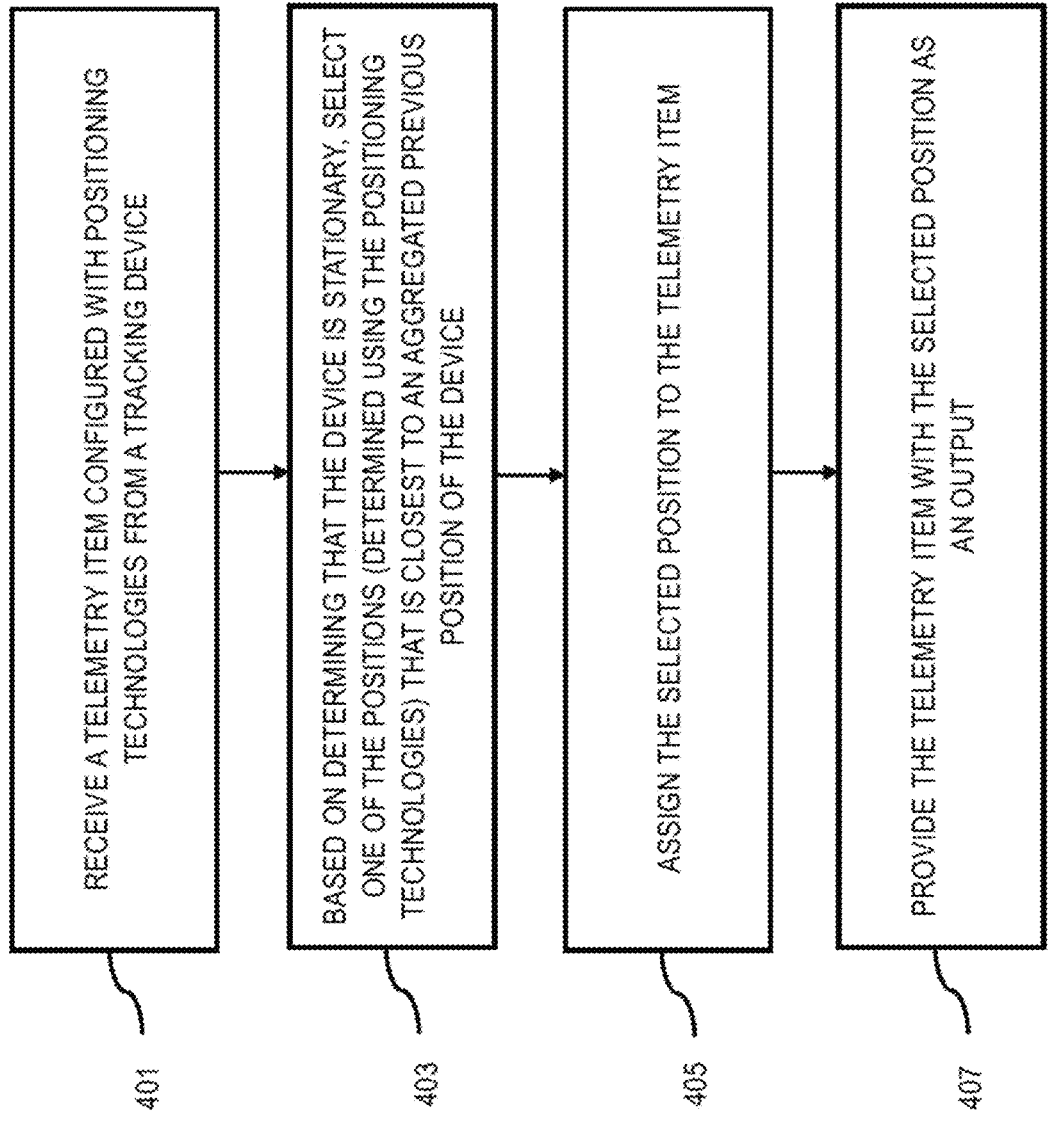
FIG. 4 is a flowchart of a process for multimodal position selection based on an aggregated previous position of a tracking device, according to example embodiment(s)
Figure 9:
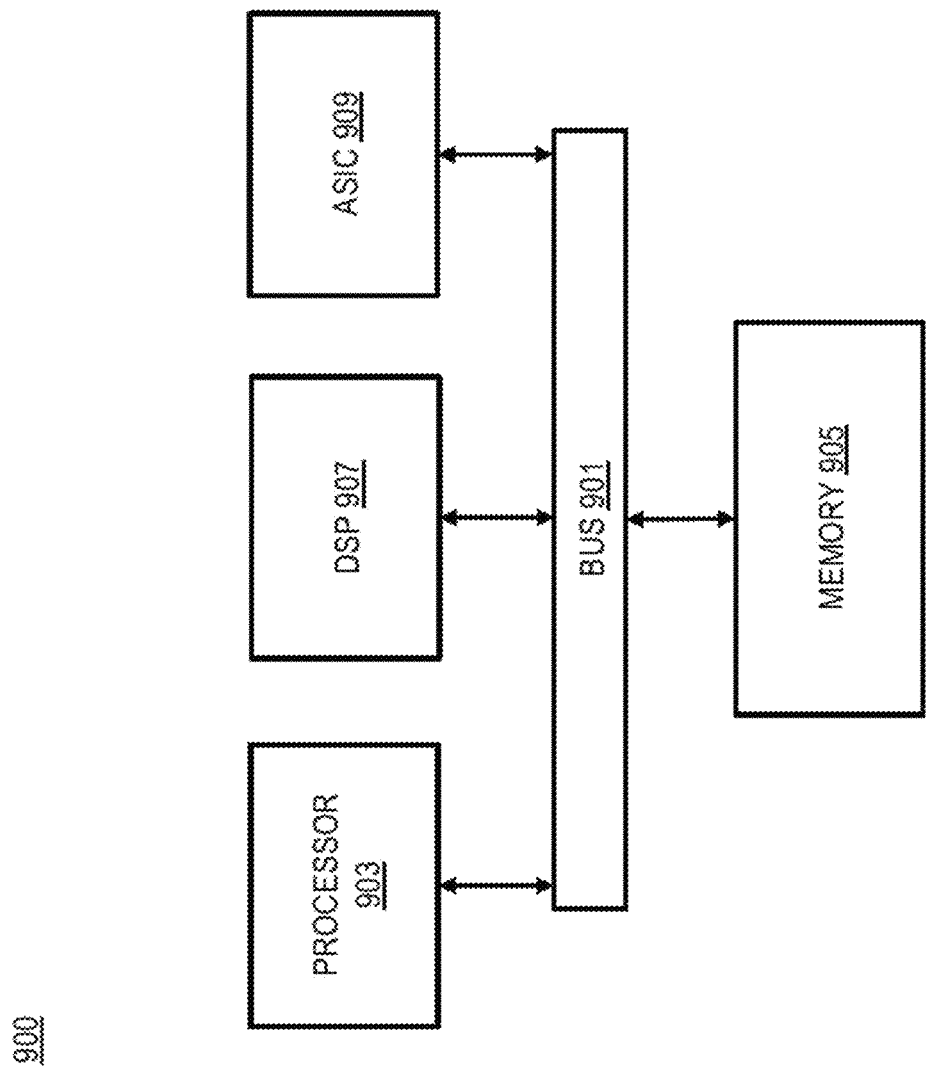
FIG. 9 is a diagram of a chip set that can be used to implement an embodiment.

FIG. 4 is a flowchart of a process for multimodal position selection based on an aggregated previous position of a tracking device, according to example embodiment(s). In various embodiments, the mapping platform 109, and/or any of the modules 301-307 may perform one or more portions of the process 400 and may be implemented in, for instance, a chip set including a processor and a memory as shown in FIG. 9. As such, the mapping platform 109, and/or the modules 301-307 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In one embodiment, for example, in step 401, the data processing module 301 can receive a telemetry item from a tracking device (e.g., the tracker 101). The tracking device is configured with a plurality of positioning technologies to generate position signals respectively. For example, the plurality of positioning technologies can include a satellite-based positioning technology, a WLAN based positioning technology, a short-range wireless (e.g., Bluetooth) based positioning technology, a cellular-based positioning technology, an indoor positioning technology, or a combination thereof. For instance, the position signals may include position coordinates (latitude, longitude) and an accuracy measure from GNSS sensors, and/or scans based on different positioning technologies, such as WLAN-scans, cell-scans, Bluetooth-scans, or indoor-position. The data processing module 301 can derive an AP MAC address/cell ID/BT MAC Address and a RSSI (signal strength) measure from a scan, and then select a current position for the tracker 101.

A plurality of positions of the tracking device are respectively determined using the position signals. In terms of position coordinates, the tracker 101 can simply provide a generic position, for which the relevant positioning method information is not necessarily revealed. In terms of GNSS-positions, many tracking tracker 101 can determine their locations (latitude and longitude coordinates) using a global navigation satellite system. To conserve battery power, the GNSS-positions are not always recorded.

In terms of WLAN-positions, the tracker 101 may send WLAN-scans as part of the telemetry. For instance, the WLAN-scans are based on signals from devices of the IEEE 802.11 family of standards. A WLAN-scan include a list of WLAN access points and their respective signal strengths that the tracker 101 has measured. A WLAN-position is obtained as a response when such scan is sent to an external positioning service (e.g., a positioning API). MILAN-positions are typically one of the most accurate position options when the tracker 101 is indoors.

A beacon (e.g., a WLAN access point) can include one or more transceivers that send wireless signals to and receive wireless signals from other devices nearby. Beacon signals can include radio, infrared, ultrasonic, optical, laser, or other types of signals that indicate the proximity or location of a tracker and/or its readiness to perform a task. Beacon signals can carry critical and/or constantly changing parameters, such as power-supply information, relative address, location, timestamp, signal strength, available bandwidth resources, temperature, pressure, etc. Beacon signals are transparent to users, yet integrated into scientific and commercial applications, such as mobile networks, search-and-rescue operations, location-tracking systems, etc.

In terms of Bluetooth-based positioning, a Bluetooth scan contains information about the nearby Bluetooth beacons and their signal strengths. Bluetooth-based positions are resolved (e.g., in the system 100) from a Bluetooth-scan. Bluetooth-positions are typically one of the most accurate position options when the tracker 101 is indoors. However, the coverage of Bluetooth-based positioning is typically not as good as for WLAN, since WLAN-access points can be found anywhere in public and private buildings, whereas Bluetooth beacons used for positioning are typically installed only for special needs.

In terms of Cell-positions, a Cell position is a position that is resolved (in the system 100) using cellular measurements. The system 100 can support CDMA, LTE, TC-SCDMA, WCDMA, GSM, etc. cell scans. A cellular network may for example be mobile phone network like a 2G/3G/4G/5G/6G cellular communication network. Typically, the cell positioning method is the least accurate of the positioning technologies. On the other hand, it is almost always available, regardless that the tracker 101 is indoors or outdoors.

In terms of Indoor positions, the system 100 can provide the special indoor positions for certain users. Indoor positions are typically more accurate than other positioning technologies. since it uses special technology customized for each environment/building respectively. For instance, indoor positions can be tracked using RFID tags, ultra-wide band (UWB) tags, etc. UWB positioning offers an accuracy of 10-30 cm. As other instances, indoor positions can be resolved using WLAN and/or Bluetooth scans. The indoor positions may not be enabled for users by default, so the position selection logic can handle the indoor positions as a special case. The multimodal position selection logic can be applied to any other palette of indoor position options generated based on indoor positioning technologies.

In one embodiment, the cell 105b can be dimensioned (e.g., sized, shaped, etc.) such that the range(s) of radio frequency technologies used by indoor beacons is sufficient to be picked up when the tracker 101 arrives the cell 105b. For instance, the radio signal of a root/gateway can be detectable in a direction or a directional range that the tracker 101 is coming in to be picked up by the tracker 101. The radio signal strength of the root/gateway can be the same or similar to the remaining tree nodes, to be detectable within a certain vicinity around that node by other nodes and the tracker 101. The root/gateway can be located through a variety of geographical addressing systems (e.g., a grid-modeling strategy or any other predetermined scheme(s)), and the tracker 101 can have a positioning mechanism within the addressing system/schema to navigate its way to the root/gateway address.

By way of examples, cells can be tiles, hexagons, or any other suitable tessellation. The cell dimensions (e.g., size, shape, etc.) of the commercial example can be adapted such that its RF range is sufficient to be picked up by the tracker 101 arriving the cell. Such spatial partitions/cells can be assigned with identifiers and matched with a location to be reached by the tracker 101 while in a coverage of outdoor positioning means, such as GNSS.

The logic of the multimodal position selection can be summarized in Table 1 as follows.

TABLE 1

The logic of the multimodal position selection:
If the tracker 101 is not moving and it has been stationary for long enough,c hoose the position that has smaller distance to the aggregated previous position
If tracker 101 is moving, choose the position that has the best reported accuracy
There are some exceptions to the logic:
If there is only cell position available and cell-dropping conditions are met, do not select a position for a trace point at all.
Do not select a position option for which the speed is impossible.
WLAN-position that is obtained using 2 or 3 WLAN access points should not be used as a position option unless it gets validated against other position(s) and passes the validation (e.g., a mode of transport (e.g., subway) outlier detection).

In one embodiment, in step 403, based on determining that the tracking device is stationary by determining that at least one of the plurality of positions is less than a threshold distance from a previous position or an aggregated previous position of the tracking device, the selecting module 303 can select a position from the plurality of positions that is closest to the aggregated previous position of the tracking device. For instance, the aggregated previous position can be an average, a weighted average, a median, or a combination thereof a designated number of previous positions of the tracking device.

By way of example shown in Table 2, once the selecting module 303 detects that the tracking device has been stationary (e.g., for at least 5 trace points), the "aggregated previous position" can start to get updated (e.g., time 6 position, average of positions of times 6 & 7, etc.), and the selecting module 303 can compare the current/new position of the tracker 101 to its aggregated previous position (not to the previous position). When the tracker 101 starts moving (e.g., at time x), the aggregated previous position is set undefined, then the selecting module 303 compares the position options to the previous position.

TABLE 2 time 1: the device is moving
time 2: device is not moving (1)
time 3: device is not moving (2)
time 4: device is not moving (3)
time 5: device is not moving (4)
time 6: device is not moving (5) => set average position = time 6 position
time 7: device is not moving (6) => set average position = average of positions of times 6 & 7
. . .
time x: device starts moving => set average position undefined When the tracker 101 has been stationary, the current/new position of the tracker 101 is compared to its aggregated previous position (not to the previous position). When the tracker 101 has been moving, and there is no aggregated previous position available, the current/new position is compared to the previous position. For instance, when the tracker 101 has been stationary yet starts moving slowly, the selecting module 303 would not notice the tracker 101 being moving, if only comparing to the previous position (as the distance to the previous position would be small). On the other hand, the distance to the aggregated previous position grows all the time such that the tracker movement can be quickly detected.

In another embodiment, the tracking device can be determined as stationary further based on determining that the at least one of the plurality of positions is within the threshold distance for greater than a time threshold. For instance, the tracking device has been stationary for at least 5 trace points as shown in Table 2 and for 10 minutes.

The multimodal position selection logic works well when the position sample frequency is equal to or less frequent than approximately one sample per minute. When the sampling frequency is more than one sample/minute), the position selection logic does not provide practical difference form the existing position selection approach. However, with more sophisticated moving detection technologies become available, the position selection logic can be applicable for more frequent sampling frequencies. Since the main use case is the sampling frequency<one sample/minute, the moving estimation logic does not consider the time difference of the two adjacent positions.

In another scenario, based on determining that the tracking device is moving by determining that at least one of the plurality of positions is greater than the threshold distance from the previous position or the averaged previous position of the tracking device, the selecting module 303 can select a position from the plurality of positions that is associated with a best reported accuracy. For instance, the tracking device is considered moving if the positions of two consecutive trace points differ more than 100 meters plus the combined positioning accuracies. When the tracking device has been stationary for long enough, the position options are compared to the "aggregated previous position" and not to the previous position. The accuracy of a position is reported in meters. The position with the smallest accuracy value is considered to have the best reported accuracy.

In one embodiment, when determining that the plurality of positions includes a cellular-based position, the selecting module 303 can eliminate the cellular-based position from the selecting based on a cell-dropping condition. For instance, the cell-dropping condition can include determining that there has been a position fix for the tracking device within a previous designated time window and the cell-based position has not changed by more than a threshold value. By way of example, the selecting module 303 can set the current position of the tracker 101 as undefined if the only position option is a cell position, if there have been some position fixes in the last 30 minutes, and/or the cell position during this past 30 minutes has not changed more than 1 km plus the combined position accuracy. The cell positions are dropped because that they are typically very inaccurate (e.g., the reported accuracy is usually measured in kilometers while the reported accuracy for other positioning technologies is typically less than 50 meters), thereby causing undesirable trace-visualization (e.g., FIG. 2A) and false geofence evaluations as discussed.

In one embodiment, the selecting module 303 can eliminate at least one position of the plurality of positions from the selecting based on determining that a speed of the tracking device at the at least one position is greater than a threshold speed (e.g., speed outlier detection). For instance, the threshold speed can be based on a transportation method (e.g., carried by a user, a vehicle, etc.) associated with the tracking device. By way of example, if a speed associated with a position option is greater than 280 m/s (i.e., 1008 km/h, such as fast airplanes), the selecting module 303 does not select the position option as the current position of the tracker 101. The threshold limit (e.g., 208 m/s) could be dynamically changed based on the mode of transport of the tracker 101. The typical cruising airspeed for a long-distance commercial passenger aircraft is approximately 880-926 km/h. If airplane is not the use case, this threshold could be significantly smaller for other modes of transport, such as walking, bicycles, vehicles, trains, subway, boats, etc.

In one embodiment, the system 100 can apply different sensor rules and/or thresholds for different positioning technologies and/or modes of transport. Optimal tracking device settings such as tracking mode and sampling and sending frequency may be defined by the mode-of-transport specific settings, based, at least in part, on the following understanding: (1) Higher sampling and sending frequencies may lead to reduced latencies, but higher battery consumption and higher data transfer rates which may have cost impact on part of the tracking device. (2) Lower sampling and sending frequencies may lead to increased latencies and missing of important events that may occur along the transportation route and a receiver of the tracked transportable asset may be interested in it, but it may also reduce battery consumption and data transfer rates enabling to keep the tracking device alive longer. This may support tracking along transportation routes taking quite some time, such as international ocean freight to name but one non-limiting example.

In one embodiment, when determining that the plurality of positions includes a WLAN position, the selecting module 303 can determine a distance between a reported location of WLAN access points (e.g., 2-3 access points) used to determine the WLAN position and at least one other position of the plurality of positions that is a non-WLAN position, and then eliminate the WLAN position from the selecting based on determining that the distance is greater than a threshold value (e.g., train/subway outlier detection). For instance, when WLAN-positions were resolved using only 2 or 3 WLAN access points by the tracker 101 (e.g., in a train), these mobile access points installed to the train in the scans can be incorrectly mapped to, for example, a railway station in the geographic database 113.

As such, these WLAN positions obtained from only few access points are considered unreliable, and the selecting module 303 can do additional validation to detect if they are obtained from the mobile access points installed in a mode of transport (e.g., a train, plane, bus, car, ferry, etc.) or not. In the validation, the selecting module 303 can use another reference position for the same telemetry entry, calculate a distance between them. If the distance plus combined position accuracies exceed a threshold (e.g., 10 km), the WLAN position is considered unreliable, and the selecting module 303 cannot not select it as the current location of the tracker 101. To get a reference position, the selecting module 303 can request to get extra position(s) (e.g., a cell position) for the WLAN-position validation. If there is no reference position, no position is selected as the current position of the tracker 101.

In other embodiments, one or more of the threshold values mentioned above can be defined as a range of values instead.

Figure 5A:
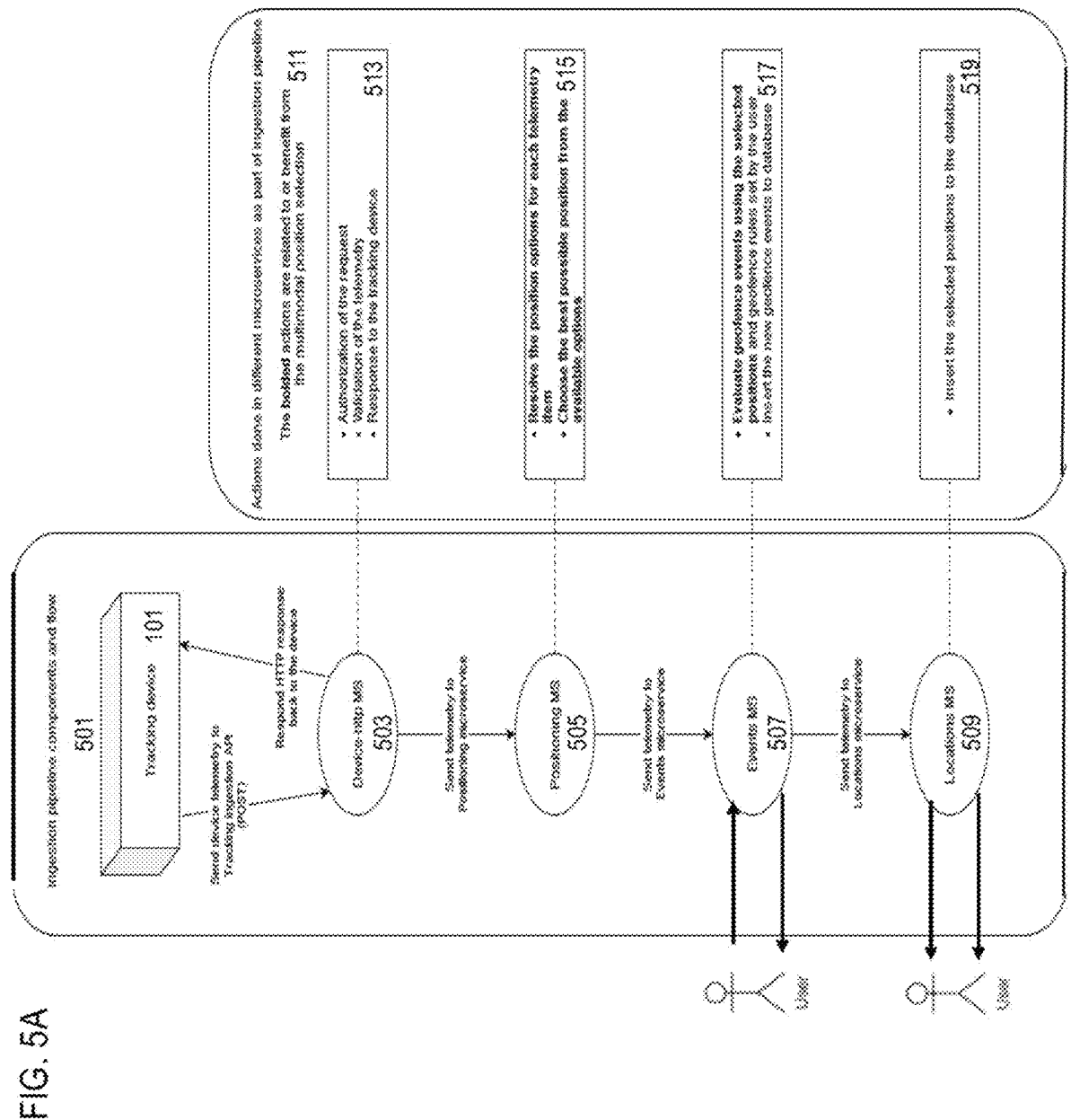
FIGS. 5A-5B are diagrams illustrating an example telemetry data ingestion pipeline and relevant actions therein, according to example embodiment(s)
Figure 5B:
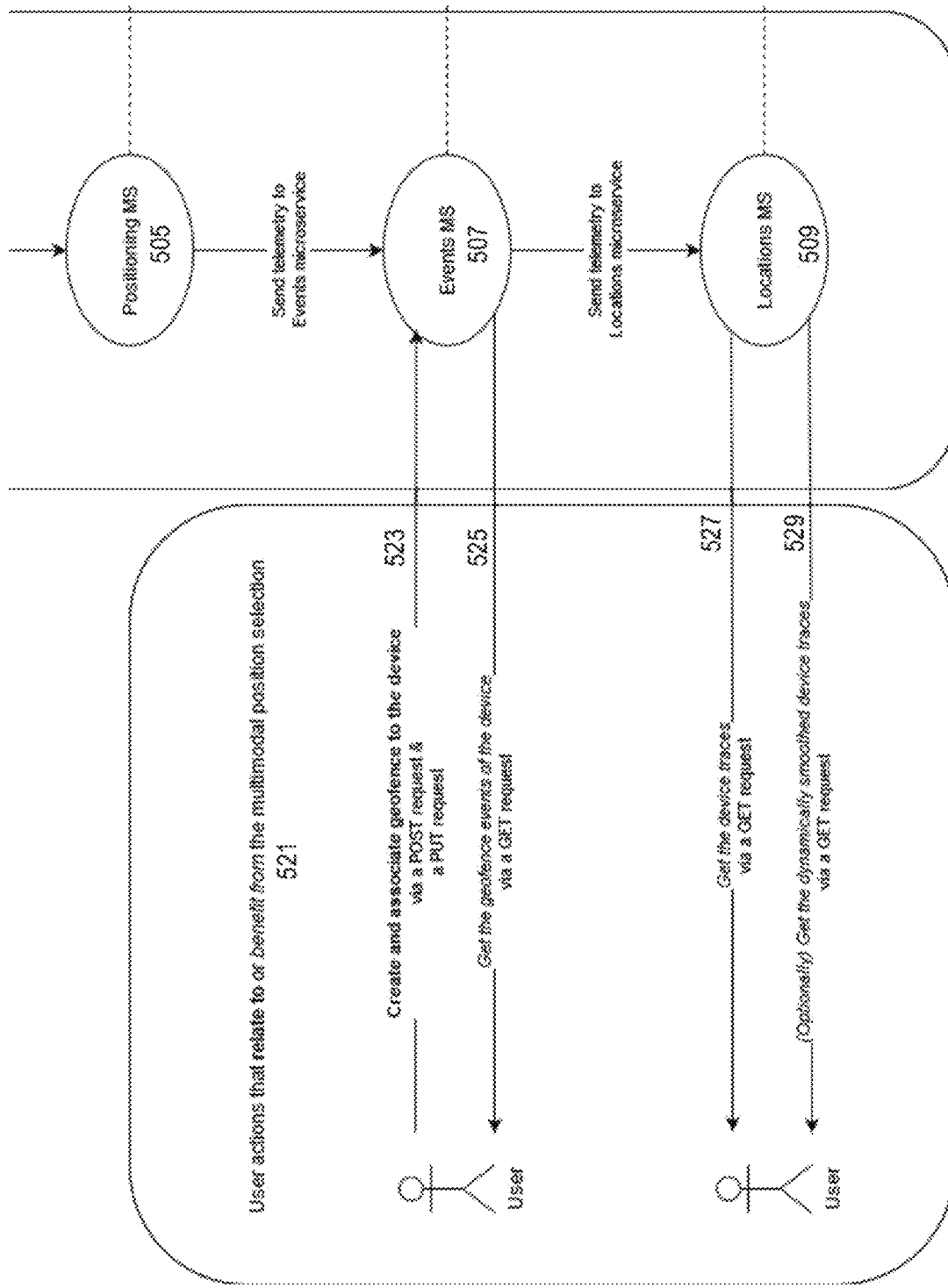

In one embodiment, to keep track if the above-mentioned thresholds are reached or not, the selecting module 303 can save the information in Table 3 to a cache for easier access, e.g., for an ingestion pipeline in FIGS. 5A-5B. Since the multimodal position selection logic uses the tracker recent location history information (e.g., including the aggregated previous position(s) and some other details), the recent location history information needs to be cached for easy access when applying the position selection logic.

TABLE 3 stationaryPointsCount: How many trace points has the device been stationary in a row
aggregatedPosition: latitude, longitude, accuracy, and timestamp. This gets updated every time the device remains stationary. This gets set to undefined if the device moves. The timestamp is the timestamp of the telemetry that last updated the aggregated position
previousPosition: the previous position of the device and its timestamp
lastMovedTimestamp: Timestamp of when the device was last detected to be moving
lastCellPosition: Last cell position which is used when deciding if cell-dropping conditions are met The multimodal position selection logic as discussed above can be applied in an asset tracking system (e.g., the system 100) in the middle of an ingestion pipeline. FIGS. 5A-5B are diagrams illustrating an example telemetry data ingestion pipeline 501 and relevant actions therein, according to example embodiment(s). In FIG. 5A, the pipeline 501 can start with the tracker 101 sending its telemetry data to a device-http microservice (MS) 503 via a tracking ingestion API (POST) of the system 100 (e.g., an asset tracking cloud). After some standard procedures related to API handling, the telemetry data is sent via a framework implementation of a software bus further to a positioning MS 505 where the position options are first resolved. That is done using an external positioning service, e.g., a positioning API.

At this point, there might be in practice from 0 to 3 positions to choose from per one telemetry item. Next, the position selection logic is applied in the positioning MS 505. After the selection, the best position is assigned to the telemetry item and the competing position options are deleted.

After the position has been selected, the telemetry with the selected position is passed via the software bus to an events MS 507, where the geofence evaluations are handled. During the evaluations, the selected position is used to determine if the device was inside or outside of geofences defined by the user. After event evaluation, the telemetry data is passed to a locations MS 509, where the device's traces are updated with the new telemetry entries with the best selected position. The user can then make a request to the locations service, and receive a response of the device's traces, which can be, for example, visualized in a map user interface as FIGS. 6A-6D.

FIG. 5A also lists detailed actions 511 performed in different MSs as part of the ingestion pipeline 501. In particular, the bolded actions are related to or benefit from the multimodal positioning selection logic). The device-http MS 503 takes actions 513 including authorization of the request, validation of the telemetry, response to the tracking device 101 (e.g., responding an HTTP response back to the device), etc. The positioning MS 505 takes actions 515 including resolving the position options for each telemetry item, choosing the best possible position from the available options, etc. The events MS 507 takes actions 517 including evaluating geofence events using the selected positions and geofence rules set by the user, inserting the new geofence events to a database (e.g., the geographic database 113). The locations MS 509 takes actions 519 including inserting the selected positions to the database.

FIG. 5B lists user actions 521 that relate to or benefit from the multimodal positioning selection logic based on the telemetry data with the selected position at the events MS 507 and the locations MS 509. For instance, the user can create and associate geofence to the device in Step 523 (the relates to the multimodal positioning selection logic) by sending a POST request to /geofences/v2 and a PUT request to/associations/v3/{trackingId}/geofences/{geofenceId}. Based on the telemetry data with the selected position of the device and the geofence rules set by the user, the events MS 507 can evaluate whether any geofence events occur, and insert any new geofence event(s) to a database. Subsequently, the user can get the geofence events of the device in Step 525 (the benefits from the multimodal positioning selection logic) by sending a GET request to /events/v3/{trackingId}?eventSource=geofence. In addition, the user can get the device traces in Step 527 (the benefits from the multimodal positioning selection logic) by sending a GET request to/traces/v2/{trackingId}. The response contains the selected positions of the tracking device, as in the example FIG. 2B. Optionally, the user can get dynamically smoothed device traces in Step 529 (the benefits from the multimodal positioning selection logic) by sending a GET request /traces/v2/{trackingId}?smooth=true. The response contains positions of the device that are dynamically smoothed, as in the example FIG. 2C.

In one embodiment, in step 405, the selecting module 303 can assign the selected position to the telemetry item.

In one embodiment, in step 407, the output module 307 can provide the telemetry item with the selected position as an output. For instance, the output can be used to determine whether the tracking device is within a geofence, to create a location trace of the tracking device, or a combination thereof.

As shown in FIG. 2B, the multimodal position selection logic has advantages for trace visualization and geofence evaluation, since it stabilizes the tracker's positions. Since the logic removes some unnecessary noise from the traces when the tracker is stationary, it improves the visualization of the traces in a map user interface as tracker positioning data among other device-reported information as in FIGS. 6A-6D.

In addition, the multimodal position selection logic reduces false positive geofence events. Implementing the position selection logic in the pipeline of FIGS. 5A-5B before the geofence evaluation, the system 100 can improve geofence evaluation thereby triggering events/actions and/or providing user interfaces about geofence events (among other types of events).

In one embodiment, the smoothing module 305 can delete one or more of the plurality of positions that are not the selected position from the telemetry item. In addition to the position selection improvements shown in FIG. 2B, an additional dynamical smoothing algorithm can be applied to smooth the position data in a UI 240 as shown in FIG. 2C. For instance, the smoothing algorithm can map the selected stationary positions to a single average position to further clean up the trace visualization when the tracker 101 is stationary. This smoothing does not influence on the moving trace points. In the tracking pipeline of FIGS. 5A-5B, the dynamical smoothing of tracker traces is realized in a traces API with additional query parameter(s) such as "smooth=true". By default, the "raw" positions gotten using the multimodal position selection logic can be provided to the user.

Figure 6A:
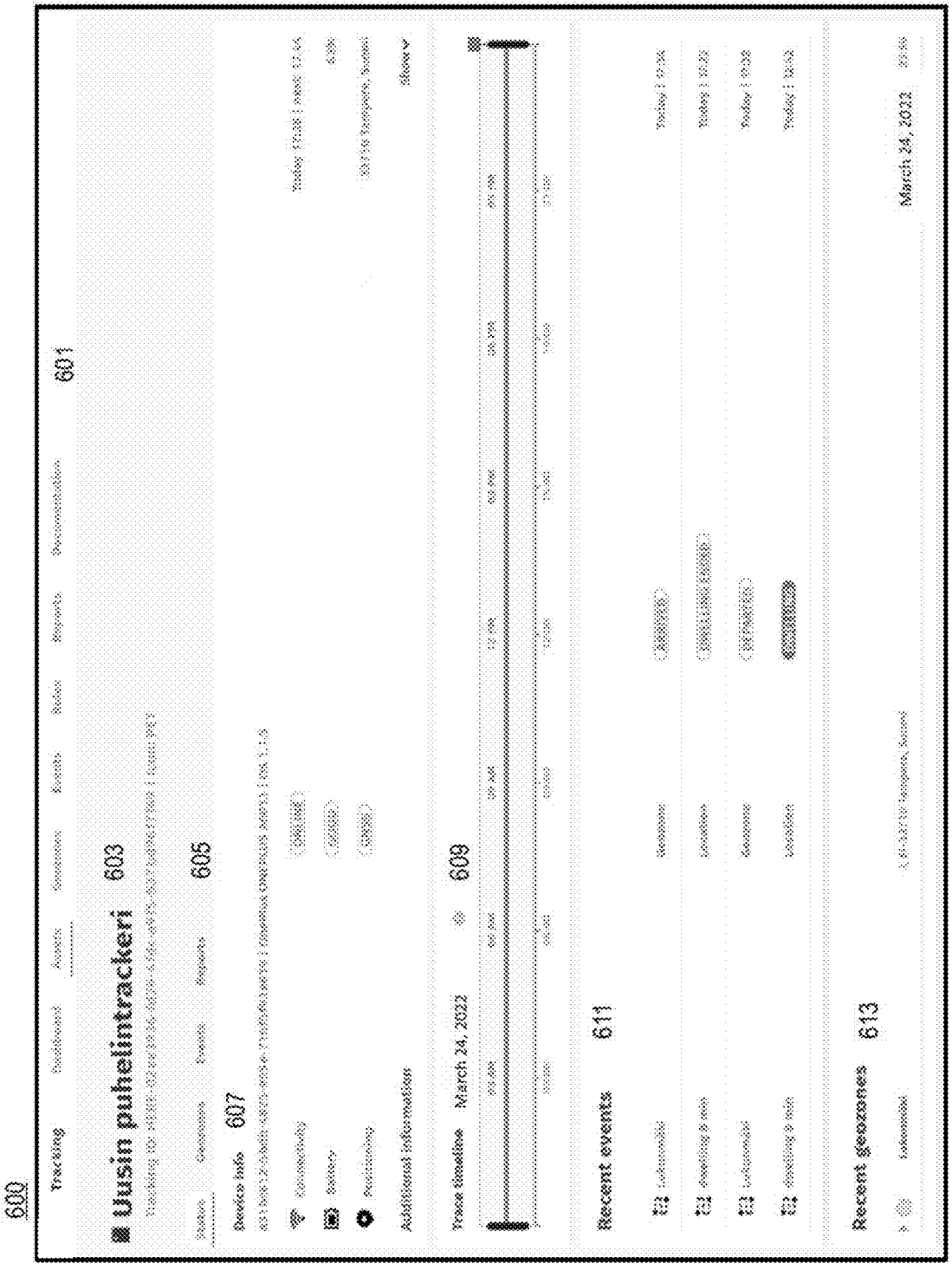
FIGS. 6A-6D are diagrams of example user interfaces for asset tracking, according to example embodiment(s)

FIGS. 6A-6D are diagrams of example user interfaces for asset tracking, according to example embodiment(s). For example, FIG. 6A illustrates an example UI 600 for tracking assets based on the above-discussed embodiments. In this context, the UI 600 shows a control pane 601 of the system 100 with an "Assets" tab highlighted and an example asset pane 603 with an asset ID, a tracking ID, and a description of a tracked asset. The control pane 601 incudes other tabs such as Dashboard, Geozones, Events, Rules, Reports, and Documentation.

Figure 6B:
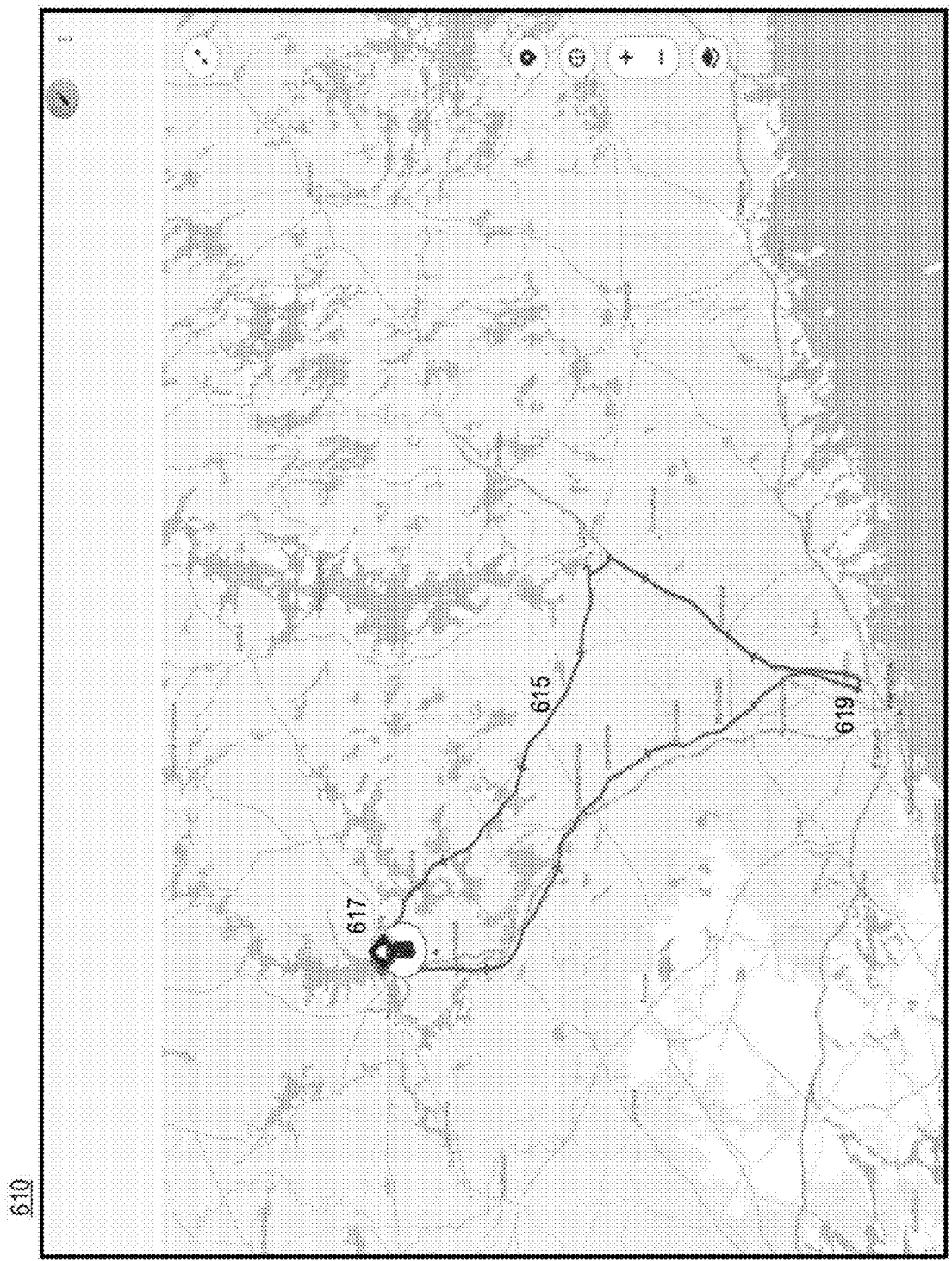

The UI 600 also shows a sub-control pane 605 with a "Status" tab highlighted and detailed status information listed in a Device Info pane 607, a Trace Timeline Pane 609, a Recent Events pane 611, and a Recent Geozones 613 associated with the tracked asset. The sub-control pane 605 incudes other tabs such as Geozones, Events, and Reports. In this case, the Device Info pane 607 provides more details of the tracked asset, such as Connectivity: Online, Battery: Good, Positioning: GNSS, etc. The Trace Timeline Pane 609 shows the tracked timeline of interest as the while day of Mar. 24, 2022. Since the tabs of Geozones and Events were not selected in the sub-control pane 605, only the most recent entries of Geozones and Events are listed in the Recent Events pane 611 and the Recent Geozones 613 respectively. For instance, the Recent Events pane 611 shows the tracked asset stayed in a location (e.g., an office) during 12:42-17:22, then arrived at Lukonmaki at 17:34, and the Recent Geozones 613 shows that last geozone as Lukonmaki on Mar. 24, 2022. FIG. 6B illustrates an example map UI 610 showing a trajectory 615 of the tracked asset that starts from an origin 617 (e.g., Tampere) to a location 619 (e.g., the Office in Helsinki) on Mar. 24, 2022.

Figure 6C:
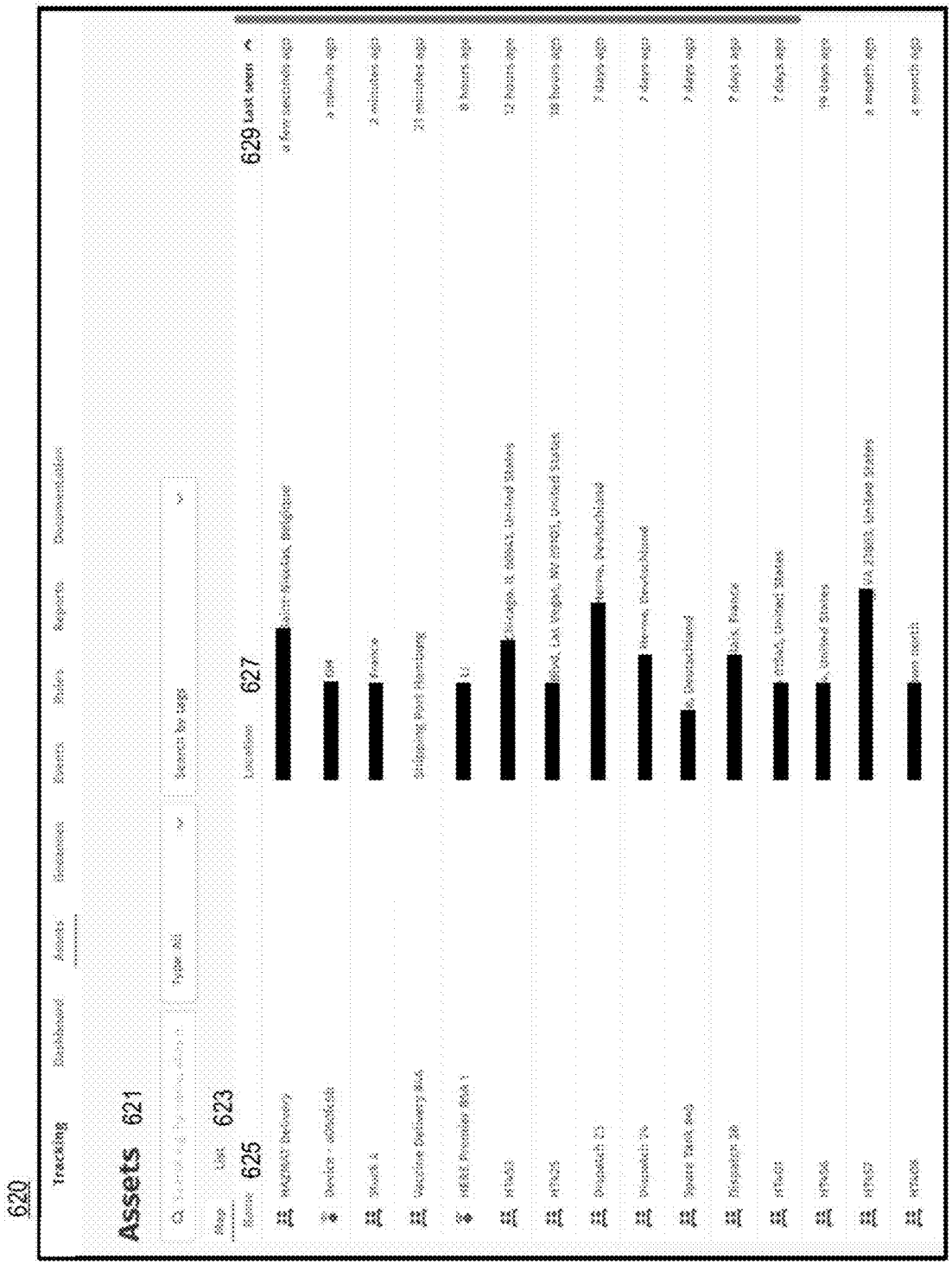
Figure 6D:
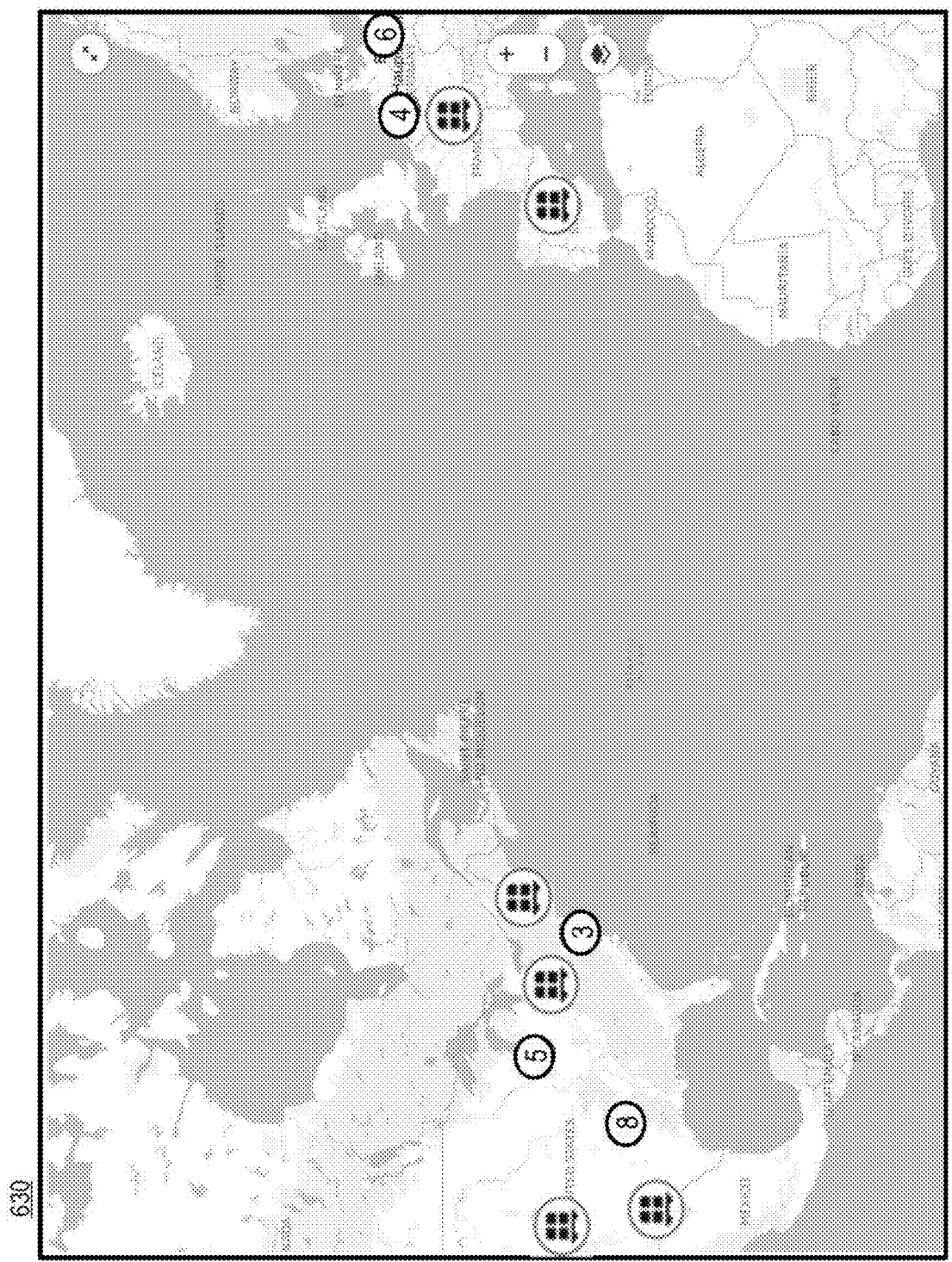

FIG. 6C illustrates an example map UI 620 with an Asset Search pane 621 and an Asset List pane 623 of tracked assets. The Asset Search pane 621 includes a search-by-name filter, a search-by-type filter, and a search-by-tag filter, while the Asset List pane 623 includes a Name column 626, a Location column 627, and a Time column 629 of the tracked assets. For instance, the Asset List pane 623 shows a hazardous material delivery tracked at a Belgium location a few seconds ago, a device tracked at a Germany warehouse one minute ago, a stuck tracked at a French location two minutes ago, etc. FIG. 6D illustrates an example map UI 630 showing some tracked assets in a global map on a Mar. 24, 2022. The priority of the tracked assets shown/ranked in the Asset List pane 623 and/or the map UI 630 can be based on time (e.g., most recent), value, sizes, insured values, etc.

It is common that tracking devices are initially configured in a manufacturing process, and then pre-configured for the duration of the entire journey. The system 100 can support minor adaptivity for the user (e.g., an asset owner/shipper, etc.) to adjust depending on state transitions, which implements e.g., distinct modes for trackers based on different attributes, such as a tracker shipping to a customer from a service provider, a tracker activated by the customer and actively tracking a shipment, and/or a tracker deactivated by the customer and on its way back to service provider. The attributes can include a data ingestion rate, which entity can see the tracking data, which sensor and location-based rules applicable in the backend service, etc. The tracking device may store such gathered (e.g. measured) telemeter data in a memory comprised by or connectable to the tracking device. The tracking device report can be generated and transmitted based on the data ingestion rate.

Although various embodiments are described with respect to an asset, it is contemplated that the approach described herein may be used with other objects, such as people, animals, vehicles, drones, robots, etc.

Returning to FIG. 1, in one embodiment, the mapping platform 109 performs the process for multimodal position selection based on an aggregated previous position of a tracking device as discussed with respect to the various embodiments described herein.

In one embodiment, the mapping platform 109 has connectivity over the communication network 115 to the services platform 117 (e.g., an OEM platform) that provides the services 119 (e.g., probe and/or sensor data collection services). By way of example, the services 119 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 uses the output (e.g. whether a road segment is closed or not) of the mapping platform 109 to provide services such as navigation, mapping, other location-based services, etc.

In one embodiment, the mapping platform 109 may be a platform with multiple interconnected components. The mapping platform 109 may include multiple servers, intelligent networking devices, computing devices, components, and corresponding software for providing parametric representations of lane lines. In addition, it is noted that the mapping platform 109 may be a separate entity of the system 100, a part of the services platform 117, a part of the one or more services 119, or included within a UE (e.g., an embedded navigation system).

In one embodiment, content providers 121 may provide content or data (e.g., including beacon domain data, drone navigation task data, drone data, etc.) to the mapping platform 109, the tracker 101, the UEs, applications 111 in the tracker 101, the services platform 117, the services 119, and the geographic database 113. The content provided may be any type of content, such as map content, textual content, audio content, video content, image content, etc. In one embodiment, the content providers 121 may provide content regarding multimodal position selection based on an aggregated previous position of a tracking device. In one embodiment, the content providers 121 may also store content associated with the mapping platform 109, the tracker 101, the UEs, the services platform 117, the services 119, and/or the geographic database 113. In another embodiment, the content providers 121 may manage access to a central repository of data, and offer a consistent, standard interface to data, such as a repository of the geographic database 113.

By way of example, the UEs are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE can support any type of interface to the user (such as "wearable" circuitry, etc.). In one embodiment, a UE may be associated with a vehicle (e.g., a mobile device) or be a component part of the vehicle (e.g., an embedded navigation system). In one embodiment, the UEs may include the mapping platform 109 to provide multimodal position selection based on an aggregated previous position of a tracking device.

In one embodiment, the telemetry data with selected positions of the tracker 101 can be reported from in real-time, in batches, continuously, or at any other frequency requested by the system 100 over, for instance, the communication network 115 for processing by the mapping platform 109. The telemetry data with selected positions of the tracker 101 can be stored in the geographic database 113. In one embodiment, the system 100 (e.g., via the mapping platform 109) generates telemetry data with selected positions of the tracker 101 as discussed with respect to the various embodiments described above to provide multimodal position selection based on an aggregated previous position of a tracking device. In one embodiment, the telemetry data with selected positions of the tracker 101 are stored in the geographic database 113.

In one embodiment, as previously stated, the tracker 101 and/or the UE built-in with the tracker 101 can be configured with various sensors (e.g., sensors 107) for multimodal position selection based on an aggregated previous position of a tracking device. In one embodiment, the sensed data represents sensor data associated with a beacon location or coordinates at which the sensor data was collected (e.g., a latitude and longitude pair). By way of example, the sensors 107 may include a RADAR system, a LiDAR system, global positioning sensor for gathering location data (e.g., GPS), a network detection sensor for detecting wireless signals or receivers for different short-range communications (e.g., Bluetooth, WLAN, Li-Fi, near field communication (NFC) etc.), temporal information sensors, a camera/imaging sensor for gathering image data, an audio recorder for gathering audio data, velocity sensors, and the like.

Other examples of sensors 107 may include light sensors, orientation sensors augmented with height sensors and acceleration sensors (e.g., an accelerometer can measure acceleration and can be used to determine orientation of the tracker/UE), tilt sensors to detect the degree of incline or decline of a UE along a path of travel, moisture sensors, pressure sensors, etc. In a further example embodiment, sensors 107 about the perimeter of the tracker/UE may detect the relative distance of the tracker/UE from a beacon, the presence of other trackers/UEs, beacons, and any other objects, etc. In one scenario, the sensors 107 may detect weather data, traffic information, or a combination thereof. In one embodiment, a tracker/UE may include GPS or other satellite-based receivers to obtain geographic coordinates from satellites for determining current location and time. Further, the location of the tracker/UE can be determined by visual odometry, triangulation systems such as A-GPS, Cell of Origin, or other location extrapolation technologies.

It is noted therefore that the above described data may be transmitted via the communication network 115 as packets according to any known wireless communication protocols. For example, each tracker 101 may be assigned a unique probe identifier (probe ID) for use in reporting or transmitting the packets collected by the tracker 101 and/or UEs. In one embodiment, each tracker 101 is configured to transmit packets, which are individual data records for multimodal position selection based on an aggregated previous position of a tracking device.

In one embodiment, the mapping platform 109 receives and aggregates packets gathered and/or generated by tracker 101, the beacons and/or the UEs resulting from the travel of the tracker 101 and/or the UEs within or across domains, and updates the domain data and/or beacon cluster/tree graphs accordingly.

In one embodiment, the communication network 115 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the tracker 101, the beacons, UEs, the sensors 107, mapping platform 109, applications 111, services platform 117, services 119, and/or content providers 121 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is the to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
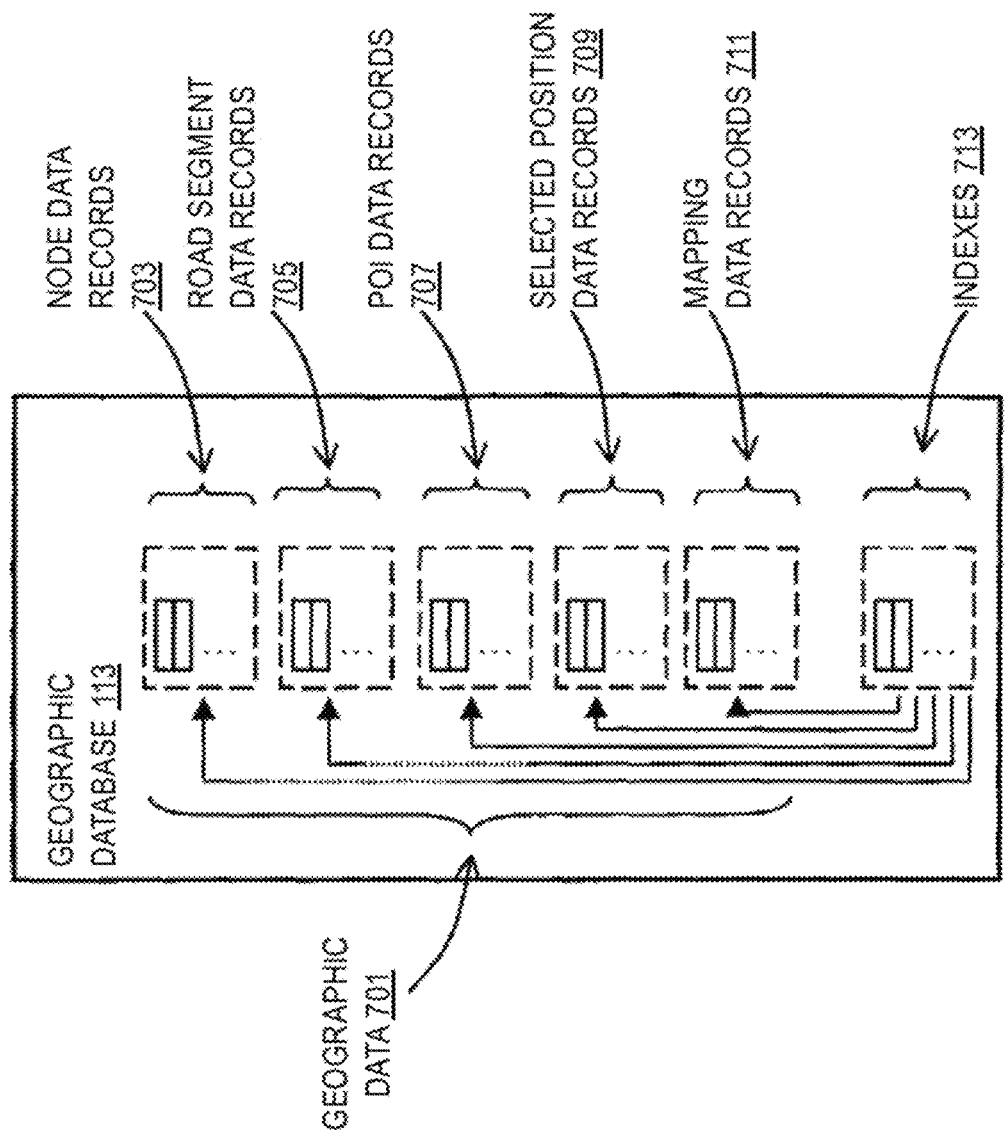
FIG. 7 is a diagram of a geographic database, according to example embodiment(s)

FIG. 7 is a diagram of a geographic database (such as the database 113), according to one embodiment. In one embodiment, the geographic database 113 includes geographic data 701 used for (or configured to be compiled to be used for) mapping and/or navigation-related services, such as for video odometry based on the parametric representation of lanes include, e.g., encoding and/or decoding parametric representations into lane lines. In one embodiment, the geographic database 113 include high resolution or high definition (HD) mapping data that provide centimeter-level or better accuracy of map features. For example, the geographic database 113 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 711) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"— A point that terminates a link.

"Line segment"— A straight line connecting two points.

"Link" (or "edge")—A contiguous, non-branching string of one or more line segments terminating in a node at each end.

"Shape point"— A point along a link between two nodes (e.g., used to alter a shape of the link without defining new nodes).

"Oriented link"— A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 703, road segment or link data records 705, POI data records 707, selected position data records 709, mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 113. In one embodiment, the indexes 713 may be used to quickly locate data without having to search every row in the geographic database 113 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points (such as intersections) corresponding to the respective links or segments of the road segment data records 705. The road link data records 705 and the node data records 703 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 707. The geographic database 113 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city). In one embodiment, certain attributes, such as lane marking data records, mapping data records and/or other attributes can be features or layers associated with the link-node structure of the database.

In one embodiment, the geographic database 113 can also include selected position data records 709 for storing tracker travel history data, telemetry data with selected positions of trackers, training data, prediction models, annotated observations, computed featured distributions, sampling probabilities, and/or any other data generated or used by the system 100 according to the various embodiments described herein. By way of example, the selected position data records 709 can be associated with one or more of the node records 703, road segment records 705, and/or POI data records 707 to support localization or visual odometry based on the features stored therein and the corresponding estimated quality of the features. In this way, the records 709 can also be associated with or used to classify the characteristics or metadata of the corresponding records 703, 705, and/or 707.

In one embodiment, as discussed above, the mapping data records 711 model road surfaces and other map features to centimeter-level or better accuracy. The mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 711 are divided into spatial partitions of varying sizes to provide mapping data to vehicles and other end user devices with near real-time speed without overloading the available resources of the vehicles and/or devices (e.g., computational, memory, bandwidth, etc. resources).

In one embodiment, the mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 711.

In one embodiment, the mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 113 can be maintained by the content provider 121 in association with the services platform 117 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle and/or user terminals along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle or a user terminal, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for multimodal position selection based on an aggregated previous position of a tracking device may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
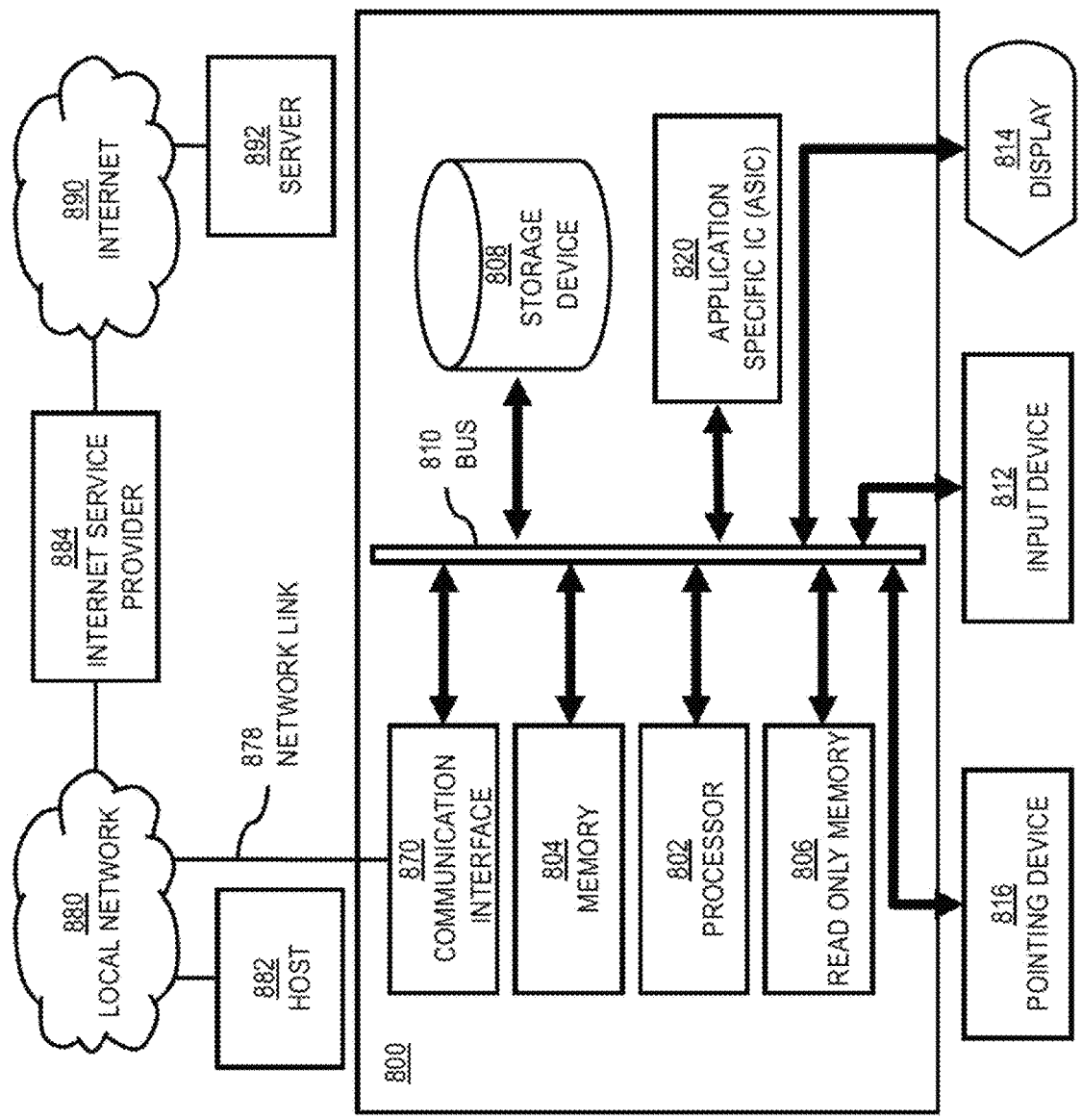
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to provide multimodal position selection based on an aggregated previous position of a tracking device as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to multimodal position selection based on an aggregated previous position of a tracking device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RANI) or other dynamic storage device, stores information including processor instructions for multimodal position selection based on an aggregated previous position of a tracking device. Dynamic memory allows information stored therein to be changed by the computer system 800. RANI allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for multimodal position selection based on an aggregated previous position of a tracking device, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 115 for multimodal position selection based on an aggregated previous position of a tracking device.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

FIG. 9 illustrates a chip set 900 upon which an embodiment of the invention may be implemented. Chip set 900 is programmed to provide multimodal position selection based on an aggregated previous position of a tracking device as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide multimodal position selection based on an aggregated previous position of a tracking device. The memory 905 also stores the data associated with or generated by the execution of the inventive steps.

Figure 10:
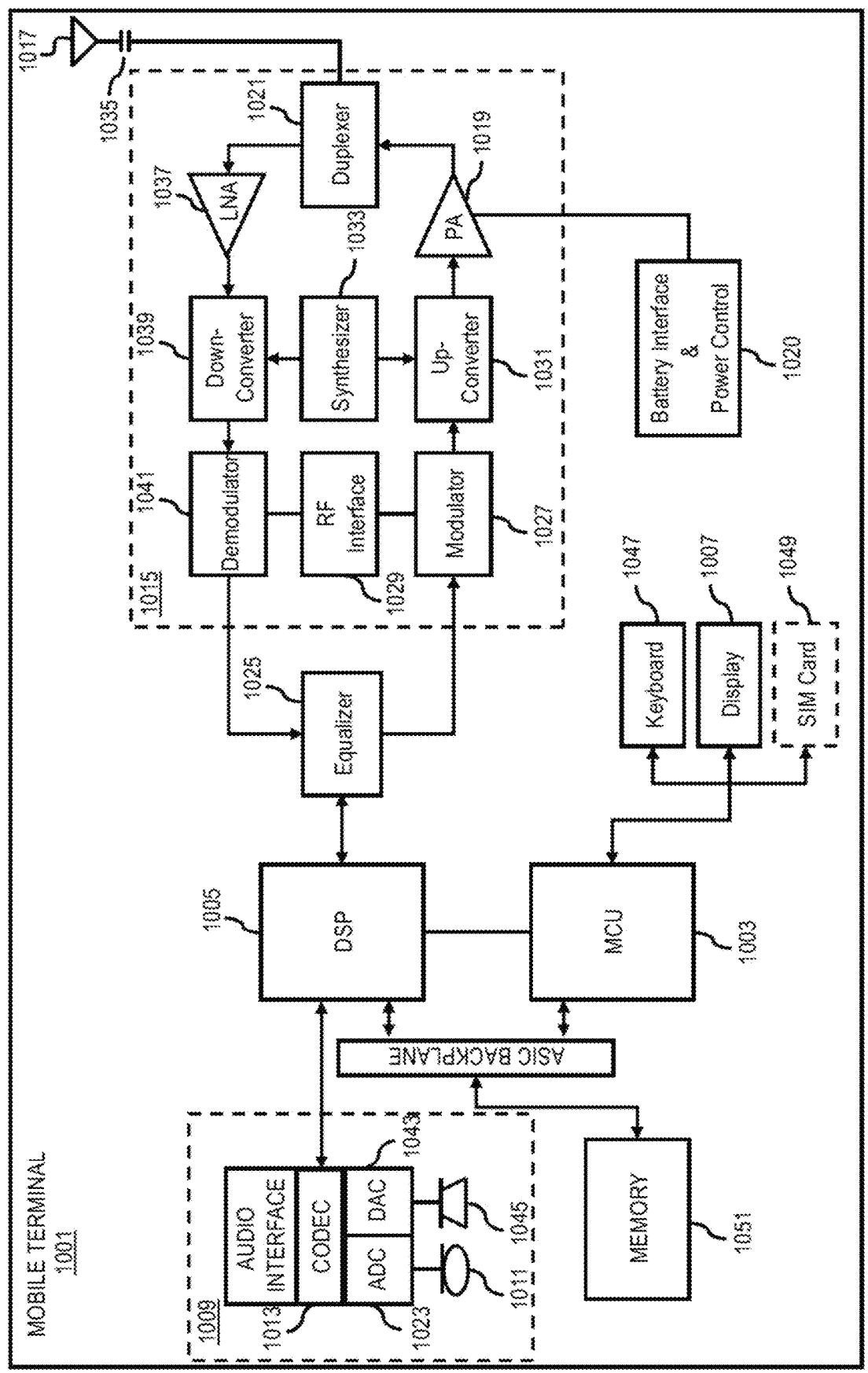
FIG. 10 is a diagram of a mobile terminal (e.g., handset or vehicle or part thereof) that can be used to implement an embodiment.

FIG. 10 is a diagram of exemplary components of a mobile terminal 1001 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide multimodal position selection based on an aggregated previous position of a tracking device. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining a first position option for a current position of a tracking device and a second position option for the current position, wherein the tracking device is configured with a first positioning technology that is used to determine the first position option and a second positioning technology that is used to determine the second position option, and wherein the first positioning technology is different from the second positioning technology;
    selecting between a first process and a second process for selecting the current position of the tracking device,
        wherein the first process is selected based on determining that the tracking device is stationary by determining that the first position option or the second position option is less than a threshold distance from a previous position or an aggregated previous position of the tracking device, wherein the first process comprises selecting the current position from either of the first position option or the second position option that is closest to the aggregated previous position of the tracking device, and wherein the previous position or the aggregated previous position is determined prior to the first position option and the second position option; and
        wherein the second process is selected based on determining that the tracking device is moving by determining that the first position option or the second position option is greater than the threshold distance from the previous position or the aggregated previous position of the tracking device, and wherein the second process comprises selecting the current position from either of the first position option or the second position option that is associated with a best reported accuracy;
    assigning the selected current position to a telemetry item; and
    providing the telemetry item with the selected position as an output.

2. The method of claim 1, wherein the aggregated previous position is an average, a weighted average, a median, or a combination thereof a designated number of previous positions of the tracking device.

3. The method of claim 1, wherein the determining that the tracking device is stationary is further based on determining that the first position option or the second position option is within the threshold distance for greater than a time threshold.

4. The method of claim 1, wherein the first positioning technology, the second positioning technology, or a combination thereof includes a satellite-based positioning technology, a wireless local area network (WLAN) based positioning technology, a short-range wireless based positioning technology, a cellular-based positioning technology, an indoor positioning technology, or a combination thereof.

5. The method of claim 1, further comprising:
    determining that the first position option or the second position option includes a cellular-based position; and
    eliminating the cellular-based position from the selecting based on a cell-dropping condition.

6. The method of claim 5, wherein the cell-dropping condition includes determining that there has been a position fix for the tracking device within a previous designated time window and the cell-based position has not changed by more than a threshold value.

7. The method of claim 1, further comprising:
    eliminating the first position option or the second position option from the selecting based on determining that a speed of the tracking device at the at least one position is greater than a threshold speed.

8. The method of claim 7, wherein the threshold speed is based on a transportation method associated with the tracking device.

9. The method of claim 1, further comprising:
    determining that the first position option or the second position option includes a wireless local area network (WLAN) position;
    determining a distance between a reported location of WLAN access points used to determine the WLAN position and the first position option or the second position option that is a non-WLAN position; and
    eliminating the WLAN position from the selecting based on determining that the distance is greater than a threshold value.

10. The method of claim 1, wherein the output is used to determine whether the tracking device is within a geofence, to create a location trace of the tracking device, or a combination thereof.

11. The method of claim 1, further comprising:
    deleting the first position option or the second position option that is not the selected current position from the telemetry item.

12. An apparatus comprising:
    at least one processor; and
    at least one memory including computer program code for one or more programs,
    the at least one memory and the computer program code configured to, with the at least one processor, cause the apparatus to perform at least the following, determine a first position option for a current position of a tracking device and a second position option for the current position, wherein the tracking device is configured with a first positioning technology that is used to determine the first position option and a second positioning technology that is used to determine the second position option, and wherein the first positioning technology is different from the second positioning technology;

selecting between a first process and a second process for selecting the current position of the tracking device,
  wherein the first process is selected based on determining that the tracking device is stationary by determining that the first position option or the second position option is less than a threshold distance from a previous position or an or the aggregated previous position of the tracking device, wherein the first process causes the apparatus to select the current position from either of the first position option or the second position option that is closest to the aggregated previous position of the tracking device, and wherein the previous position or the aggregated previous position is determined prior to the first position option and the second position option; and
  wherein the second process is selected based on determining that the tracking device is moving by determining that the first position option or the second position option is greater than the threshold distance from the previous position or the aggregated previous position of the tracking device, and wherein the second process causes the apparatus to select the current position from either of the first position option or the second position option that is associated with a best reported accuracy;

assign the selected current position to a telemetry item; and provide the telemetry item with the selected position as an output.

13. The apparatus of claim 12, wherein the aggregated previous position is an average, a weighted average, a median, or a combination thereof a designated number of previous positions of the tracking device.

14. The apparatus of claim 12, wherein the determining that the tracking device is stationary is further based on determining that the first position option or the second position option is within the threshold distance for greater than a time threshold.

15. The apparatus of claim 12, wherein the first positioning technology, the second positioning technology, or a combination thereof includes a satellite-based positioning technology, a wireless local area network (WLAN) based positioning technology, a short-range wireless based positioning technology, a cellular-based positioning technology, an indoor positioning technology, or a combination thereof.

16. A non-transitory computer readable storage medium including one or more sequences of one or more instructions which, when executed by one or more processors, cause an apparatus to at least perform:
  determining a first position option for a current position of a tracking device and a second position option for the current position, wherein the tracking device is configured with a first positioning technology that is used to determine the first position option and a second positioning technology that is used to determine the second position option, and wherein the first positioning technology is different from the second positioning technology;
  selecting between a first process and a second process for selecting the current position of the tracking device,
    wherein the first process is selected based on determining that the tracking device is stationary by determining that the first position option or the second position option is less than a threshold distance from a previous position or an aggregated previous position of the tracking device, wherein the first process causes the apparatus to perform selecting the current position from either of the first position option or the second position option that is closest to the aggregated previous position of the tracking device, and wherein the previous position or the aggregated previous position is determined prior to the first position option and the second position option; and
    wherein the second process is selected based on determining that the tracking device is moving by determining that the first position option or the second position option is greater than the threshold distance from the previous position or the aggregated previous position of the tracking device, and wherein the second process comprises selecting the current position from either of the first position option or the second position option that is associated with a best reported accuracy;
  assigning the selected current position to a telemetry item; and
  providing the telemetry item with the selected position as an output.

17. The non-transitory computer readable storage medium of claim 16, wherein the aggregated previous position is an average, a weighted average, a median, or a combination thereof a designated number of previous positions of the tracking device.

18. The non-transitory computer readable storage medium of claim 16, wherein the determining that the tracking device is stationary is further based on determining that the first position option or the second position option is within the threshold distance for greater than a time threshold.

* * * * *